US011991131B2

(12) United States Patent
Fried

(10) Patent No.: US 11,991,131 B2
(45) Date of Patent: May 21, 2024

(54) ENHANCED ENTERPRISE DATA SHARING TO MOBILE DEVICE USERS

(71) Applicant: Flash App, LLC, Norcross, GA (US)

(72) Inventor: Lance Fried, Aventura, FL (US)

(73) Assignee: Flash App, LLC, Norcross, GA (US)

( * ) Notice: Subject to any disclaimer, the term of this patent is extended or adjusted under 35 U.S.C. 154(b) by 0 days.

(21) Appl. No.: 17/882,346

(22) Filed: Aug. 5, 2022

(65) Prior Publication Data

US 2022/0377034 A1 Nov. 24, 2022

Related U.S. Application Data

(63) Continuation-in-part of application No. 17/183,964, filed on Feb. 24, 2021, now Pat. No. 11,627,104.
(Continued)

(51) Int. Cl.
*H04L 51/10* (2022.01)
*G06F 21/31* (2013.01)
(Continued)

(52) U.S. Cl.
CPC .............. *H04L 51/10* (2013.01); *G06F 21/31* (2013.01); *H04L 51/18* (2013.01); *H04L 51/42* (2022.05); *H04L 67/55* (2022.05)

(58) Field of Classification Search
CPC ......... H04L 51/10; H04L 51/18; H04L 51/22; H04L 51/32; H04L 67/26; H04L 12/1859; G06F 21/31; G06F 21/6209
See application file for complete search history.

(56) References Cited

U.S. PATENT DOCUMENTS

| 6,977,993 B2 | 12/2005 | Starbuck et al. |
| 7,917,505 B2 | 3/2011 | Van Gent et al. |

(Continued)

FOREIGN PATENT DOCUMENTS

| KR | 100616318 B1 | 8/2006 |
| KR | 100845348 B1 | 7/2008 |

(Continued)

OTHER PUBLICATIONS

International Search Report and Written Opinion of International Application No. PCT/US2016/018407, dated Jun. 10, 2016, 10 pages.
(Continued)

*Primary Examiner* — Kostas J Katsikis
(74) *Attorney, Agent, or Firm* — Stetina Brunda Garred & Brucker

(57) ABSTRACT

Enhanced data sharing from the enterprise to end users involves receiving a data sharing command on an administrative control panel. The data sharing command has a selection of content, identity information of a communication session initiator, and identity information of a communication session recipient. A submission request, which includes the content and identity information of the initiator is transmitted to a computing device associated with the recipient. Local records on the recipient computing device are updatable with the received visual content and the identity information of the initiator. This data is presentable to the recipient upon an incoming communications session request.

19 Claims, 27 Drawing Sheets

Related U.S. Application Data which is a continuation of application No. 16/590,036, filed on Oct. 1, 2019, now Pat. No. 10,965,630, which is a continuation-in-part of application No. 16/523,250, filed on Jul. 26, 2019, now Pat. No. 10,992,621.

(60) Provisional application No. 62/834,197, filed on Apr. 15, 2019, provisional application No. 62/714,515, filed on Aug. 3, 2018.

(51) Int. Cl.
  *H04L 51/18* (2022.01)
  *H04L 51/42* (2022.01)
  *H04L 67/55* (2022.01)

(56) References Cited

U.S. PATENT DOCUMENTS

| | | |
|---|---|---|
| 8,396,514 B2 | 3/2013 | Adams |
| 8,577,000 B1 | 11/2013 | Brown |
| 8,799,794 B2 | 8/2014 | Cobb et al. |
| 8,817,062 B2 | 8/2014 | Howarter et al. |
| 8,913,726 B2 | 12/2014 | Brown et al. |
| 9,584,493 B1 | 2/2017 | Leavy et al. |
| 9,634,855 B2 | 4/2017 | Poltorak |
| 9,667,810 B1 | 5/2017 | Brown |
| 9,679,336 B2 | 6/2017 | Papakipos et al. |
| 10,332,218 B2 | 6/2019 | Papakipos et al. |
| 10,432,784 B2 | 10/2019 | Sapci |
| 11,206,235 B1 | 12/2021 | Sarkar |
| 11,227,626 B1 | 1/2022 | Krishnan Gorumkonda |
| 11,373,645 B1* | 6/2022 | Mathew ............... G10L 15/1815 |
| 2002/0172338 A1 | 11/2002 | Lee et al. |
| 2005/0216550 A1 | 9/2005 | Paseman et al. |
| 2006/0026277 A1 | 2/2006 | Sutcliffe |
| 2006/0052091 A1 | 3/2006 | Onyon et al. |
| 2007/0173236 A1 | 7/2007 | Vishwanathan et al. |
| 2007/0296739 A1 | 12/2007 | Lonn |
| 2008/0032670 A1 | 2/2008 | Wada et al. |
| 2008/0133641 A1 | 6/2008 | Gent et al. |
| 2009/0054092 A1 | 2/2009 | Stonefield et al. |
| 2009/0109957 A1 | 4/2009 | Caradec et al. |
| 2009/0276839 A1 | 11/2009 | Peneder |
| 2009/0296904 A1 | 12/2009 | Brewer et al. |
| 2010/0029308 A1 | 2/2010 | Tims et al. |
| 2010/0061541 A1 | 3/2010 | Ke et al. |
| 2010/0088430 A1 | 4/2010 | Ton et al. |
| 2010/0233997 A1 | 9/2010 | Hou |
| 2011/0014932 A1 | 1/2011 | Estevez |
| 2011/0197163 A1 | 8/2011 | Jegal et al. |
| 2011/0283190 A1 | 11/2011 | Poltorak |
| 2011/0288897 A1 | 11/2011 | Erhart et al. |
| 2013/0023238 A1 | 1/2013 | Kaplan et al. |
| 2013/0102297 A1 | 4/2013 | Chavernac |
| 2013/0103765 A1 | 4/2013 | Papakipos et al. |
| 2013/0179156 A1 | 7/2013 | Fried et al. |
| 2013/0254233 A1 | 9/2013 | Fagundes et al. |
| 2013/0286223 A1 | 10/2013 | Latta et al. |
| 2014/0023183 A1 | 1/2014 | Brown et al. |
| 2014/0025750 A1 | 1/2014 | Dawar et al. |
| 2014/0074728 A1 | 3/2014 | Margulies |
| 2014/0141888 A1 | 5/2014 | Pavlish |
| 2014/0157148 A1 | 6/2014 | Joo et al. |
| 2014/0161241 A1 | 6/2014 | Baranovsky et al. |
| 2015/0007351 A1 | 1/2015 | Janajri et al. |
| 2015/0172336 A1 | 6/2015 | Guignon et al. |
| 2015/0248389 A1 | 9/2015 | Kahn et al. |
| 2015/0288640 A1 | 10/2015 | Lee |
| 2016/0014059 A1 | 1/2016 | Rathod |
| 2016/0057609 A1 | 2/2016 | Nebel |
| 2016/0094708 A1 | 3/2016 | Brown |
| 2016/0219142 A1 | 7/2016 | Brown |
| 2016/0219150 A1 | 7/2016 | Brown |
| 2016/0241672 A1 | 8/2016 | Fried |
| 2017/0083172 A1 | 3/2017 | Schneider, IV et al. |
| 2017/0094023 A1 | 3/2017 | Jack et al. |
| 2017/0262139 A1 | 9/2017 | Patel |
| 2017/0278198 A1 | 9/2017 | Papakipos et al. |
| 2017/0359431 A1 | 12/2017 | Sherratt et al. |
| 2018/0295232 A1 | 10/2018 | Sapci |
| 2018/0309801 A1* | 10/2018 | Rathod ............... H04M 3/5175 |
| 2019/0037172 A1 | 1/2019 | Choi et al. |
| 2019/0068773 A1* | 2/2019 | Whitehorn ............ G06F 16/907 |
| 2019/0272064 A1 | 9/2019 | Ghassabian |
| 2020/0045003 A1 | 2/2020 | Fried |
| 2020/0045004 A1 | 2/2020 | Fried |

FOREIGN PATENT DOCUMENTS

| | | |
|---|---|---|
| NO | 2010134972 A1 | 11/2010 |
| WO | 2012148011 A1 | 11/2012 |
| WO | 2016126355 A1 | 8/2016 |
| WO | 2016154612 A1 | 9/2016 |

OTHER PUBLICATIONS

International Search Report and Written Opinion of International Application No. PCT/US19/43890, dated Dec. 9, 2019, 10 pages.

* cited by examiner

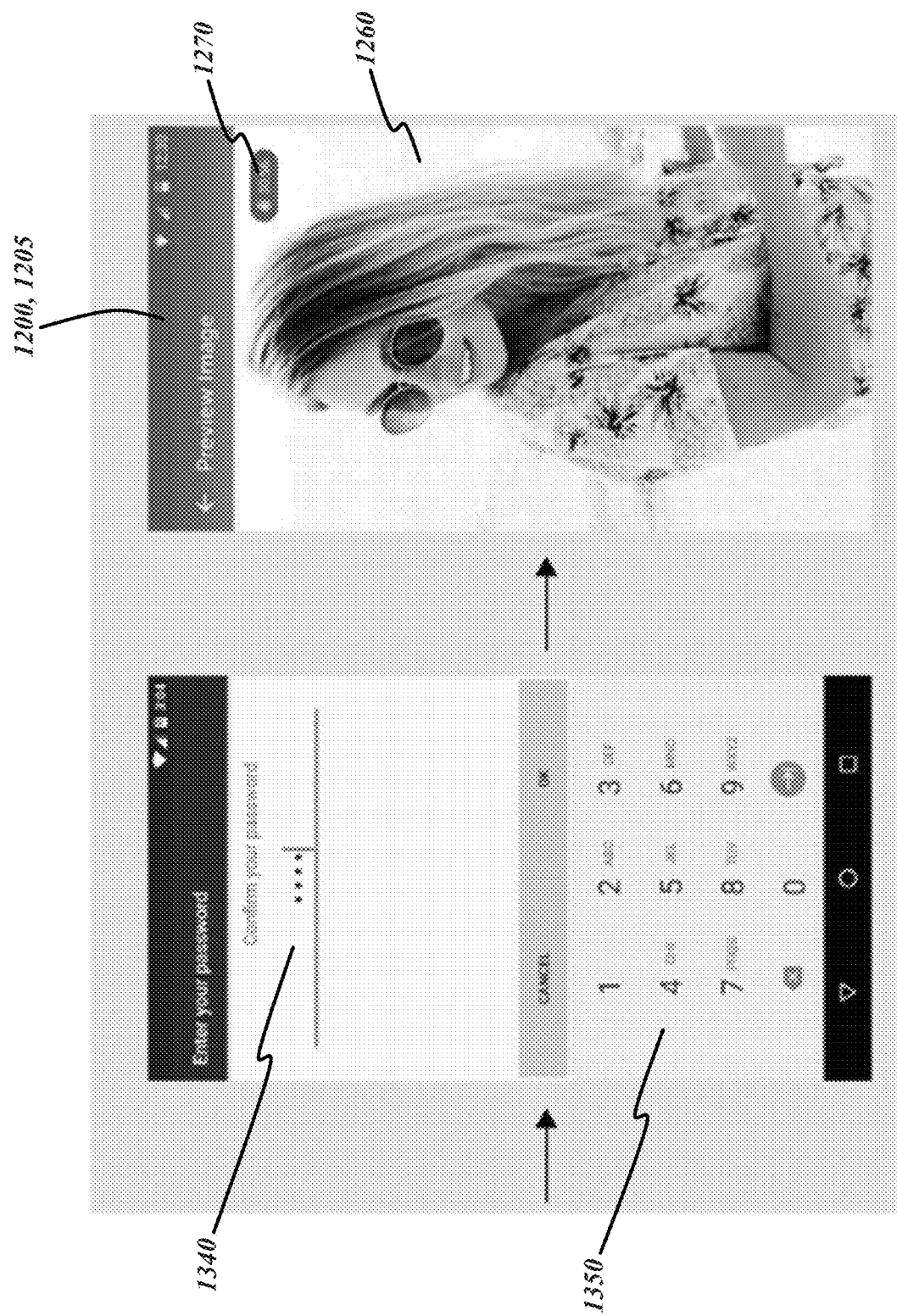

ENHANCED ENTERPRISE DATA SHARING TO MOBILE DEVICE USERS

CROSS-REFERENCE TO RELATED APPLICATIONS

This application is a continuation-in-part of continuation of U.S. application Ser. No. 17/183,964, filed Feb. 24, 2021 and entitled "ENHANCED DATA SHARING TO AND BETWEEN MOBILE DEVICE USERS," which is a continuation of U.S. application Ser. No. 16/590,036, filed Oct. 1, 2019, now U.S. Pat. No. 10,965,630, issued Mar. 30, 2021 and entitled "ENHANCED DATA SHARING TO AND BETWEEN MOBILE DEVICE USERS," which is a continuation-in-part of U.S. application Ser. No. 16/523,250, filed Jul. 26, 2019, now U.S. Pat. No. 10,992,621, issued Apr. 27, 2021 and entitled "ENHANCED DATA SHARING TO AND BETWEEN MOBILE DEVICE USERS," which relates to and claims the benefit of U.S. Provisional Application No. 62/714,515, filed Aug. 3, 2018, and U.S. Provisional Application No. 62/834,197, filed Apr. 15, 2019, the contents of each of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to telecommunication systems and, more particularly, to cellular telecommunications, smartphone applications, enterprise communications systems.

2. Related Art

Smartphones, social networks, and telecommunication systems facilitate the sharing of comments, photographs, and other data amongst mobile users. These users typically establish accounts for smartphone data storage, application downloads and social networks, create profiles containing basic biographic data, and create individual contact lists to share personal data and communicate with. The subject matter of comments posted on social networking sites oftentimes touch upon daily life experiences, including those relating to user status, commentary, and photographs. Today over 70% of all social posts occur on mobile smartphone devices. Accordingly, the viewing and sharing of user-generated content on smartphones to social networking sites from smartphones provides users a valuable and entertaining experience.

Various social network systems offering mobile applications for smartphone users to post are known in the art, including Facebook, LinkedIn, Twitter, Instagram, and so forth. Unfortunately, however, the logic of these systems, in order to take action and provide user posts in the form of status, commentary, videos, and photographs, are designed specifically for use and display within the respective social networks and do not contemplate usage for real-time native smartphone telephony interactions.

Another problem that besets social network applications in providing user posts in the form of status, commentary, videos, and photographs is that social networks do not have the logic or know-how to mix user posts and selected user personal data with smartphone telephony interactions and match it with user selected individuals of smartphone devices and user-initiated telephony interactions. As a result, extending social user post capabilities to smartphone telephony interactions has yet to be made available.

Accordingly, there is a need in the art to connect user social post capabilities in the form of status, commentary, videos, photographs, and other directed content with smartphone user contact records and subsequent smartphone telephony interactions so that users can share various status types such as status, commentary, videos, photographs, and other content with their contacts, affiliated groups and/or desired recipients or any combination of people at the onset of a smartphone telephony or other visual telephony interaction via a phone line, cell tower, or the internet based on system and user defined parameters.

In addition, there is a need in the art to extend current social post and profile capabilities to be more personalized/individualized and dynamic so that users can share specific content and specific profile pictures with individual contacts, groups and/or desired recipients of any combination of people within their respective social networks.

Some of these drawbacks are addressed by the system described in U.S. Patent Application Pub. No. 2016/0241672, entitled "SYSTEM FOR BRIDGING, MANAGING, AND PRESENTING SMARTPHONE AND OTHER DATA FILES WITH TELEPHONY INTERACTIONS," the entire contents of which is hereby wholly incorporated by reference. However, additional functionality for enhancing social and telephony interactions is desirable, as well as functionality for enhancing non-social communications between consumers and businesses, municipalities, or other service providers.

In this regard, telephone calls initiated by such entities to consumers frequently go unanswered or ignored as they appear to originate from unknown numbers. Modern smartphones are equipped with caller identification functions in which the incoming call screen shows the calling number. Because such numbers are typically not added into the contact list of the smartphone, the specific identity of the caller is not immediately apparent. By some estimates, nearly 90% of consumers do not answer calls from unknown numbers because the vast majority of calls end up being unwanted commercial solicitations (spam) or worse, such as scamsters/fraudsters. Indeed, even the Federal Communications Commission cautions not to answer calls from unknown numbers, as almost 50.5 billion robocalls were made in 2021 alone. Thus, reaching customers on important matters such as appointment reminders, school closures, flight delays, test results, subscription renewals, and the like may be delayed, or go ignored altogether. Although consumers consider the personal smartphone their communications channel of choice, because of the high volume of unwanted calls, there is understood to be very little trust.

There is accordingly a need in the art for enhanced enterprise data sharing to mobile device users that enable the presentation of the caller's identity beyond the originating number, so that customers are able to answer the needed or wanted calls. Furthermore, there is a need in the art to increase the answer rates and first call resolution rates for enterprise call centers.

BRIEF SUMMARY

The present disclosure contemplates various embodiments of a system embedded into a smartphone application to allow an enterprise to control what is displayed when a customer is called by the enterprise. Content that is presented on the customer's smartphone may be selected by the enterprise administrator to communicate to the user the identity of the caller as well as the reason for calling.

According to one embodiment of the disclosure, there may be a non-transitory program storage medium on which are stored instructions executable by a processor or programmable circuit to perform operations for enhancing data sharing. The operations may include receiving a data sharing command on an administrative control panel. The data sharing command may include a selection of content, identity information of a communication session initiator, and identity information of a communication session recipient. The operations may also include transmitting a submission request to a computing device associated with the selected communication session recipient. This step may take place in response and corresponding to the data sharing command. The submission request may include the visual content and the identity information of the communication session initiator. In response to a receipt of the submission request, local records on the computing device associated with the selected communication session recipient may be updatable with the received visual content and the identity information of the communication session initiator. This data may be presentable to the communication session recipient upon an incoming communications session request.

According to another embodiment of the present disclosure, there may be a method for enhanced enterprise data sharing to end users. There may be a step of receiving a data sharing command on a control panel for an enterprise data sharing administration system. The data sharing command may include a selection of content, identity information of a communication session initiator, and identity information of a communication session recipient. There may also be a step of transmitting a submission request in response and corresponding to the data sharing command. This submission request may originate from the enterprise data sharing administration system and received by a computing device associated with the selected communication session recipient. The submission request may include the content and the identity information of the communication session initiator. The method may also include updating local records on the computing device that is associated with the selected communication session recipient. Such update may be based upon the received content and the identity information of the communication session initiator. There may also be a step of initiating the communication session from the communication session initiator to the communication session recipient. There method may also include presenting the updated content and the identity information of the communication session initiator. This step may be performed in response to the initiated communication session.

Another embodiment of the present disclosure may be a non-transitory program storage medium on which are stored instructions executable by a processor or programmable circuit to perform operations for enhancing data sharing. The operations may include receiving a submission request on a computing device associated with a communication session recipient. The submission request may include content and identity information of a communication session initiator. The operations may also include updating, with the received submission request, a local record on the computing device associated with the communication session initiator. There may also be a step of receiving an incoming request to initiate a communication session from the communication session initiator independently of receiving the submission request. The operations may also include presenting the content and the identity information as updated in the local record on the computing device that is associated with the communication session recipient.

The present disclosure contemplates various systems, methods, and apparatuses for overcoming the above drawbacks accompanying the related art.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 4B is another sequence of screenshots of the recipient's mobile device, including a screenshot showing a user interface of a mobile application running on the recipient's mobile device;

DETAILED DESCRIPTION

The present disclosure encompasses various embodiments of systems, methods, and apparatuses for enhancing data sharing between mobile or other computing device users. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
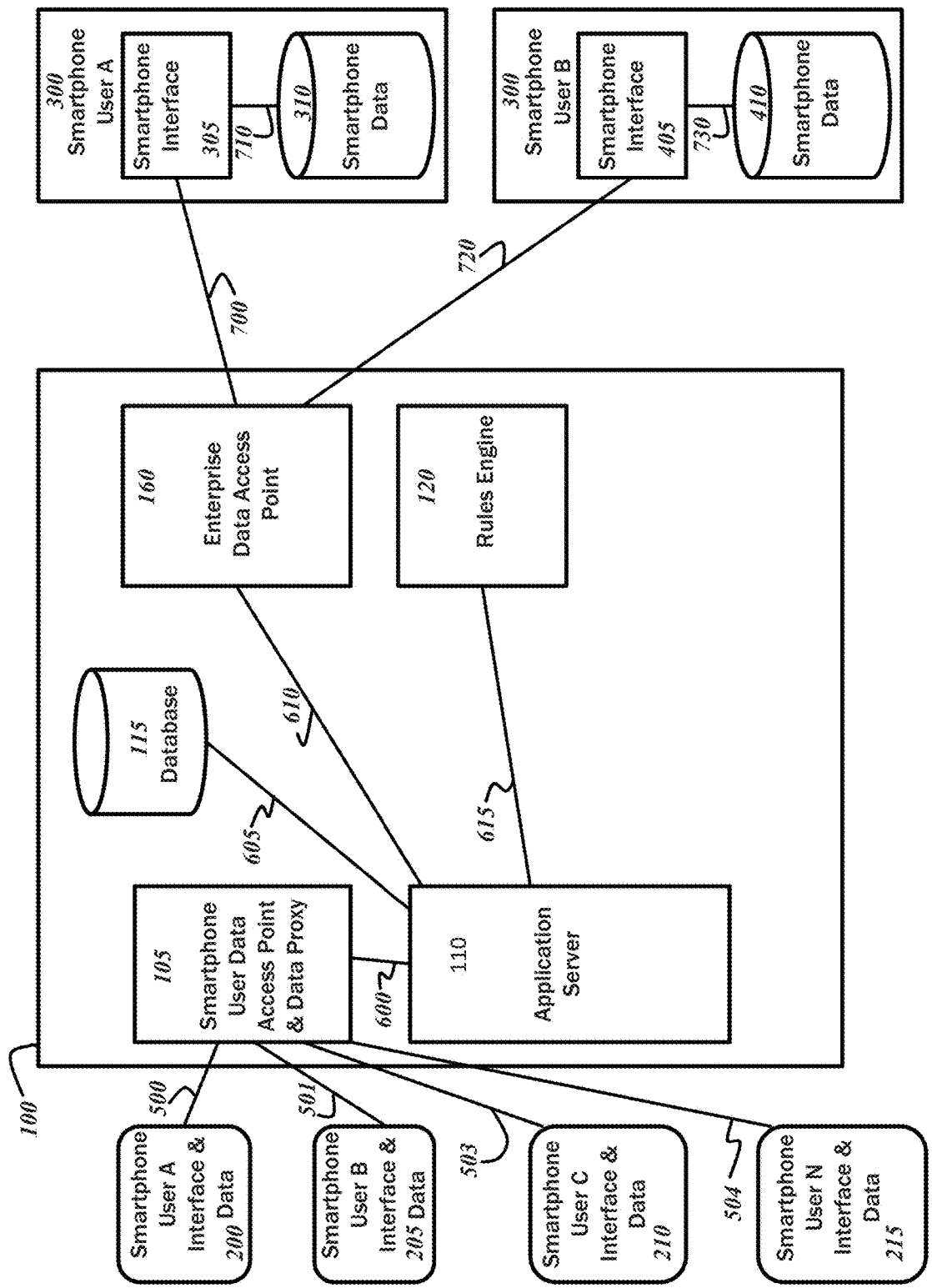
FIG. 1 is a block diagram illustrating one embodiment of a system that connects and displays selected user personal smartphone data posts in conjunction with smartphone telephony interactions for selected smartphone contact records in accordance with one embodiment of the present disclosure.

With reference to the block diagram of FIG. 1, there is a system 100 that connects and displays selected user personal smartphone data with smartphone telephony interactions. In accordance with embodiments of the present disclosure, the communications system 100 is contemplated to bridge smartphone or otherwise stored personal data, smartphone telephony interactions and social networks. The system 100 includes smartphone user access point and data proxy 105, which are connected to various smartphone user interfaces and data 200-215. By way of example, there is a user A interface and data 200 that is connected to the user access point and data proxy 105 over a connection 500, a user B interface and data 205 that is connected to the user access point and data proxy 105 over a connection 501, and a user C interface and data 210 that is connected to the user access point and data proxy 105 over a connection 503. These three user interface and data are presented by way of example only, and any additional number of user interfaces and data may be connectible to the user data access point and data proxy 105, e.g., user N interface and data 215. The aforementioned data is understood to be that which is stored on the respective smartphones, or other stored personal data over carrier networks or social networks.

There may also be an enterprise data access point 160 connected to second data links 700, 720 to access additional system users. These include a smartphone 300 for a user A, which includes a smartphone interface 305 and a smartphone data 310 that is accessed by the interface via a data interlink 710. Furthermore, by way of example, there may be another smartphone 300 for a user B, which includes a smartphone interface 405 and a smartphone data 410 that is accessed via a data interlink 730.

As shown in FIG. 1, the system 100 includes an application server 110 that is connected to the incoming data access point, i.e., the smartphone user data access point and data proxy 105 as well as the enterprise data access point 160. The post data and routing information requests may be segregated based at least on configurable routing and storage instructions. The system may further include a component database 115 that is utilized by the application server 110 over an interlink 605. Additionally, there may be a rules-based engine 120, as well as integrations to APIs from other sources for automated categorization, routing, and storage. The rules engine 120 may be connected to the application server over an interlink 615. Additionally, the application server 110 is connected to the enterprise data access point 160 over an interlink 610, and the smartphone user data access point and data proxy 105 is connected to the application server 100 over an interlink 600.

Figure 2:
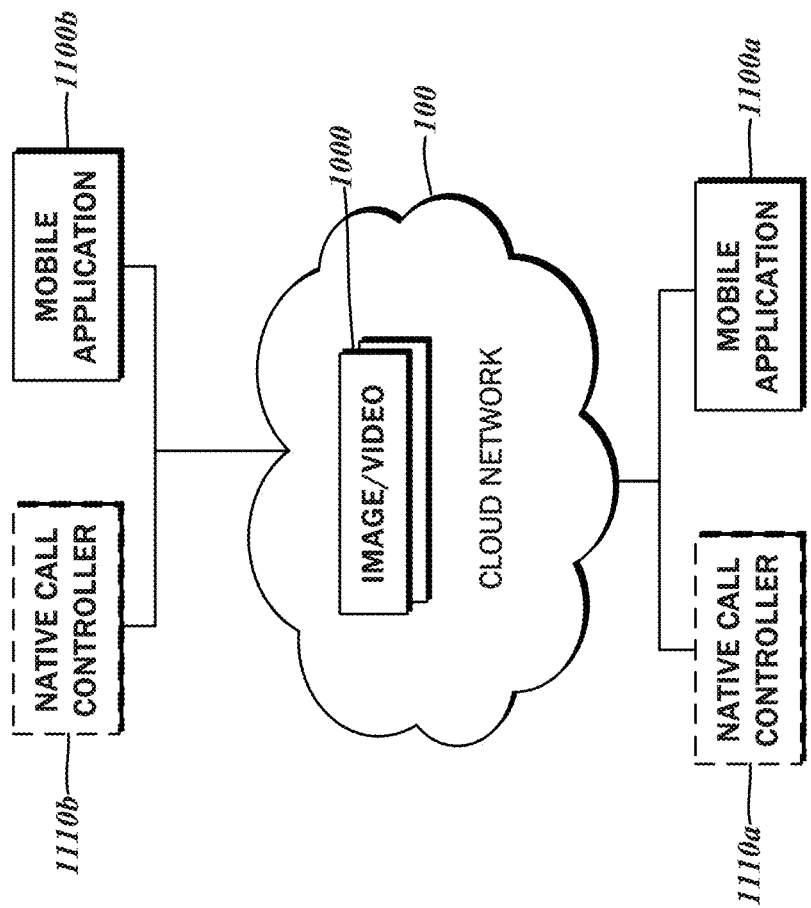
FIG. 2 is a block diagram depicting the system for connecting and displaying selected user personal smartphone data posts across multiple smartphone devices.

The block diagram of FIG. 2 depicts the system 100 on a more generalized level. As indicated above, the system 100 stores the aforementioned images, videos, and other content 1000 that is uploaded from the respective mobile devices and stored thereon for subsequent transmission. As referenced herein, content 1000 may be the exemplary images that are depicted herein, but are not intended to be limited to multimedia and other like materials. Other data, such as scheduling requests, call requests, customer service requests, and so forth are intended to be encompassed within the term content. Those skilled in the art will recognize that the specific examples shown and described herein in connection with images, are also applicable to such other content, and the various features of the present disclosure are adaptable thereto. The mobile devices each execute a mobile application 1100, with a first mobile device running a mobile application 1100*a* and a second mobile device running a mobile application 1100*b*.

Figure 3A:
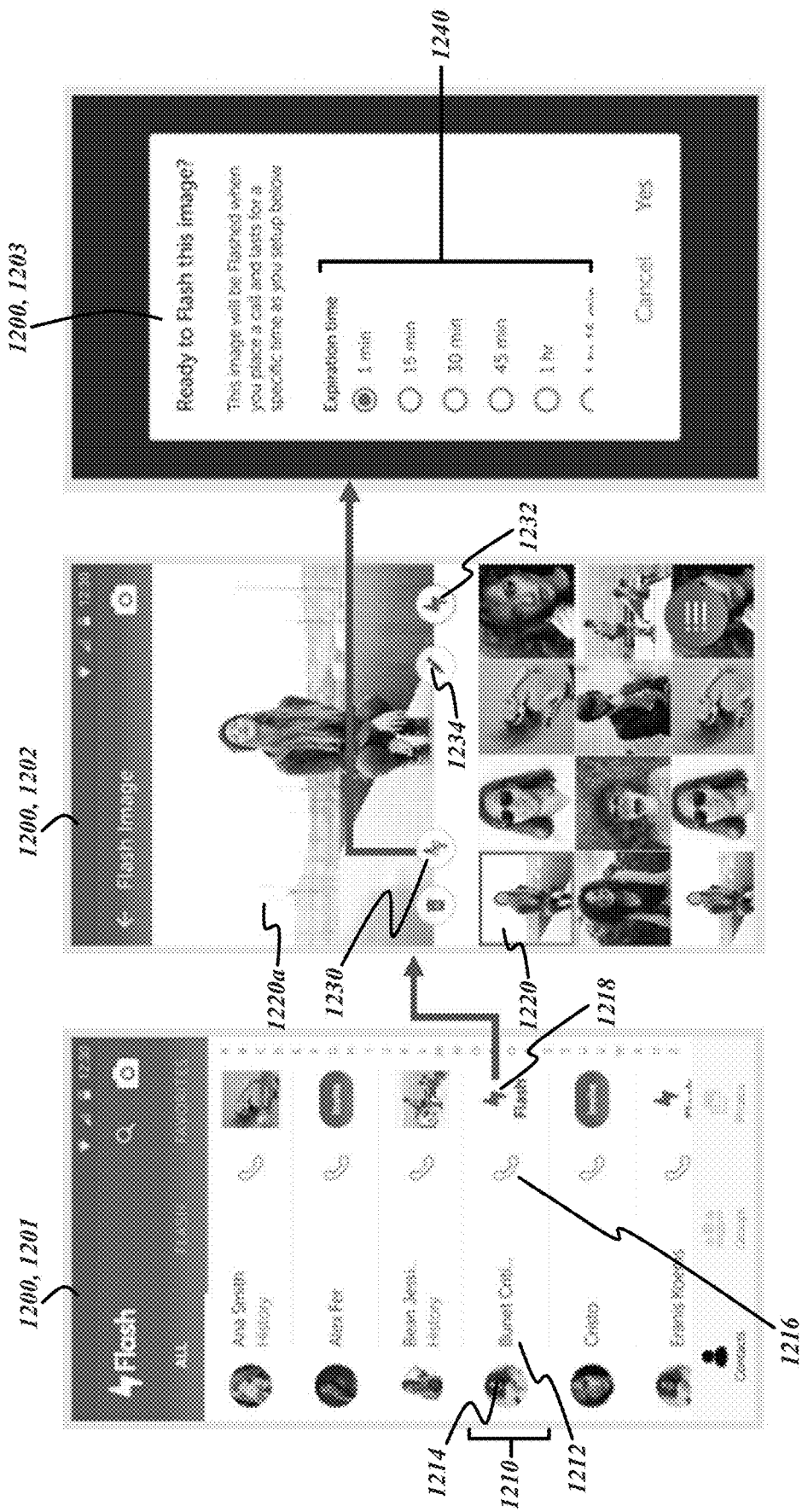
FIG. 3A is a sequence of screenshots showing a user interface of a mobile application running on a mobile device belonging to a sender of an image from among the various mobile devices that connects to the system.

FIG. 3A shows a user interface 1200 of a mobile application 1100 running on one of the various mobile devices (e.g. smartphones) that connects to the system 100. The example of FIG. 3A shows the user interface 1200 at three consecutive stages during a user's creation of a submission request for sending data from the mobile device to another mobile device via the system 100. The user's (i.e. the sender's) experience may begin at a contacts screen 1201 of the user interface 1200 as shown in the left-most screenshot of FIG. 3A. The contacts screen 1201 shows a list of the sender's contacts (e.g. in alphabetical order), which may, for example, be imported from an address book of the mobile device. Each item 1210 of the list of contacts may include a name 1212 of the contact, a thumbnail image or avatar 1214 representing the contact, a phone button 1216 for initiating a phone call with the contact, and a flash button 1218 for creating a submission request. The flash button 1218 may only be available for contacts who have the mobile application 1100 installed on their phone and are thus registered with the provider of the mobile application 1100. In the case of contacts who do not have the mobile application 1100 (e.g. "Alex Fer" and "Cristo"), the flash button 1218 may be replaced by an "Invite" button by which the user of the user interface 1200 may autogenerate an invitation message (e.g. text message, email, etc.) addressed to the contact with a link to download the mobile application 1100. As shown, in the case of some contacts who have the mobile application 1100 (e.g. "Ana Smith" and "Bean Jessi . . . "), the flash button 1218 may be replaced by a thumbnail image of the most recent image sent to that contact using the mobile application 1100. The contacts screen 1201 may include tabs (e.g. "ALL," "FLASH," "FAVORITES") for filtering the list of contacts, for example, to show all contacts, only those contacts who have the mobile application 1100, and user-designated contacts, respectively. Functionality for searching the list of contacts (e.g. magnifying glass icon) and navigating to a camera application (e.g. camera icon) may also be included on the contacts screen 1201, as well as navigation tools for navigating from the contacts screen 1201 to other screens of the mobile application 1100 (e.g. "Contacts," "Groups," "Photos").

When the sender taps the flash button 1218 (or thumbnail image of most recent image replacing the flash button 1218) associated with a contact to whom the sender would like to send an image, the user interface 1200 may navigate to an image selection screen 1202 as shown in the center screenshot of FIG. 3A. Here, the sender may select an image 1220 from a set of available images 1220 stored locally on the mobile device. The set of images 1220 may, for example, be imported from a photo library on the mobile device and may be displayed as a grid of thumbnail images 1220, as shown. As the sender taps each image 1220, the image 1220 may be marked (e.g. with a colored border) to show that it is the currently selected image 1220. A large view 1220*a* of the currently selected image 1220 may be displayed, as shown. When the sender is satisfied with the selected image 1220, the sender may tap the hidden flash button 1230 to proceed with creating the submission request.

In response to the sender's tapping of the hidden flash button 1230, the user interface 1200 may navigate to a time period selection screen 1203 (e.g. a popup window) as shown in the right-most screenshot of FIG. 3A. The time period selection screen 1203 may include a selection tool 1240 (e.g. radio buttons, input field, etc.) for allowing the sender to select a period of time for the selected image 1220 to be available for viewing by the recipient. When the sender is satisfied with the selected period of time (e.g. "1 min"), the submission request can be confirmed by tapping the "Yes" button or cancelled by tapping the "Cancel" button. Once confirmed, the completed submission request may be transmitted to the system 100 (e.g. over the Internet). The completed submission request may include the selected image 1220 (e.g. an image file) together with associated submission data indicative of the selected recipient (i.e. the contact whose flash button 1218 was used to initiate the submission request) and the selected period of time. As described in more detail below, the system 100 will then make the selected image 1220 available for viewing by the recipient for the selected period of time, beginning from the time that the submission request was generated.

Figure 3B:
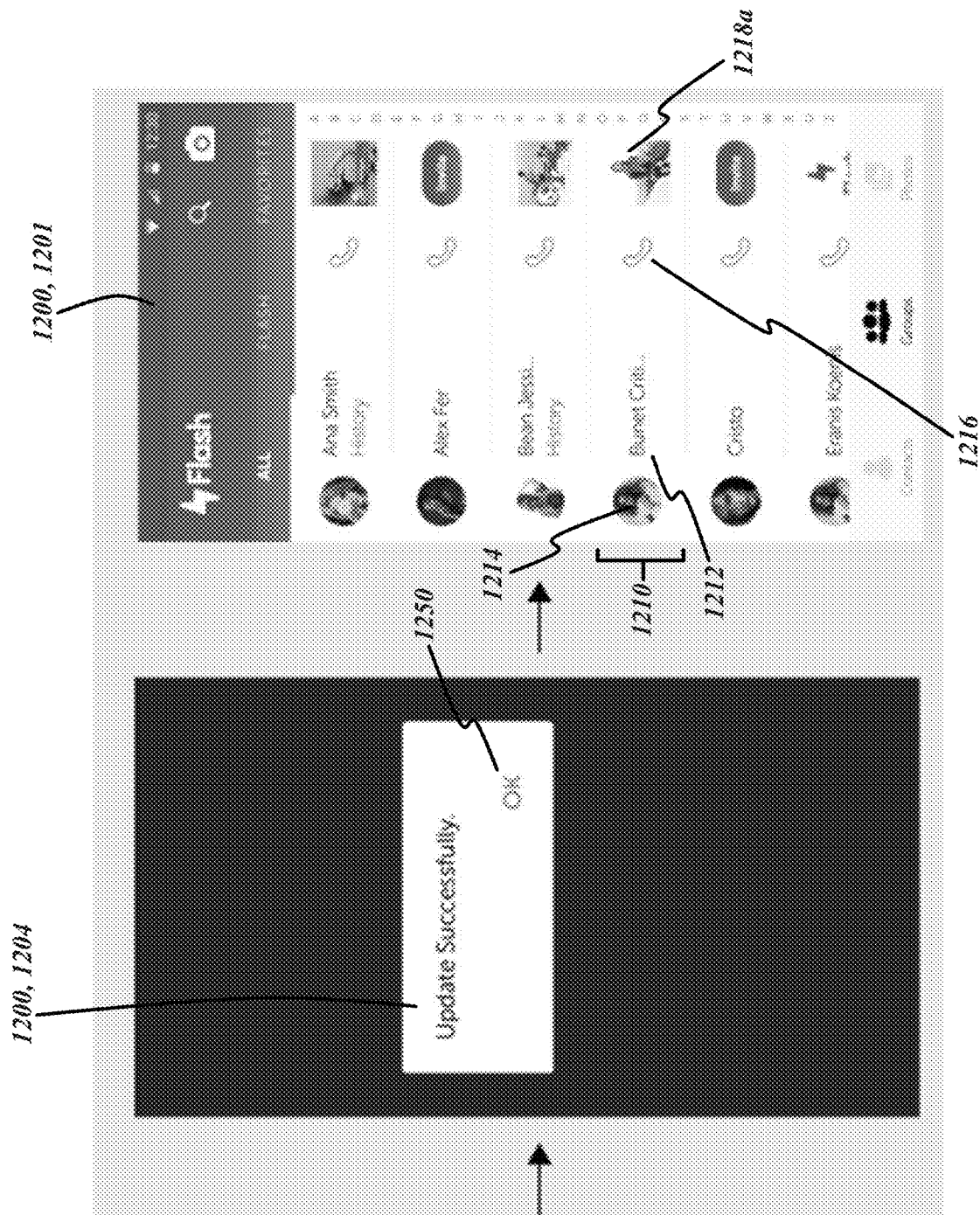
FIG. 3B is another sequence of screenshots showing the user interface of the mobile application running on the sender's mobile device.

FIG. 3B shows the user interface 1200 of the mobile application 1100 running on one of the various mobile devices that connects to the system 100. The example of FIG. 3B continues the sequence of screenshots begun in FIG. 3A with two further consecutive stages of the user interface 1200 immediately following the user's creation of the submission request. In response to the user's confirmation of the time period and completion of the submission request as shown in the right-most screenshot of FIG. 3A, the user interface 1200 may navigate to a confirmation screen 1204 (e.g. a popup window) indicating that the submission request was completed successfully. For example, the confirmation screen 1204 may confirm that the submission request was successfully uploaded to the system 100 (e.g. to the application server 101) and may wait for the user's recognition of the confirmation, for example, by tapping an OK button 1250 on the confirmation screen 1204. Thereafter, the user may be returned to the contacts screen 1201 of the user interface 1200. As shown in the right-most screenshot of FIG. 3B (in comparison with the left-most screenshot of FIG. 3A), the contacts screen 1201 may be updated to replace the flash button 1218 associated with the recipient of the recent submission request ("Burnet Criti . . . ") with a thumbnail image 1218*a* of the image of the submission request. In this way, the thumbnail image 1218*a* may indicate the most recent image that was sent to that contact using the mobile application 1100.

Figure 4A:
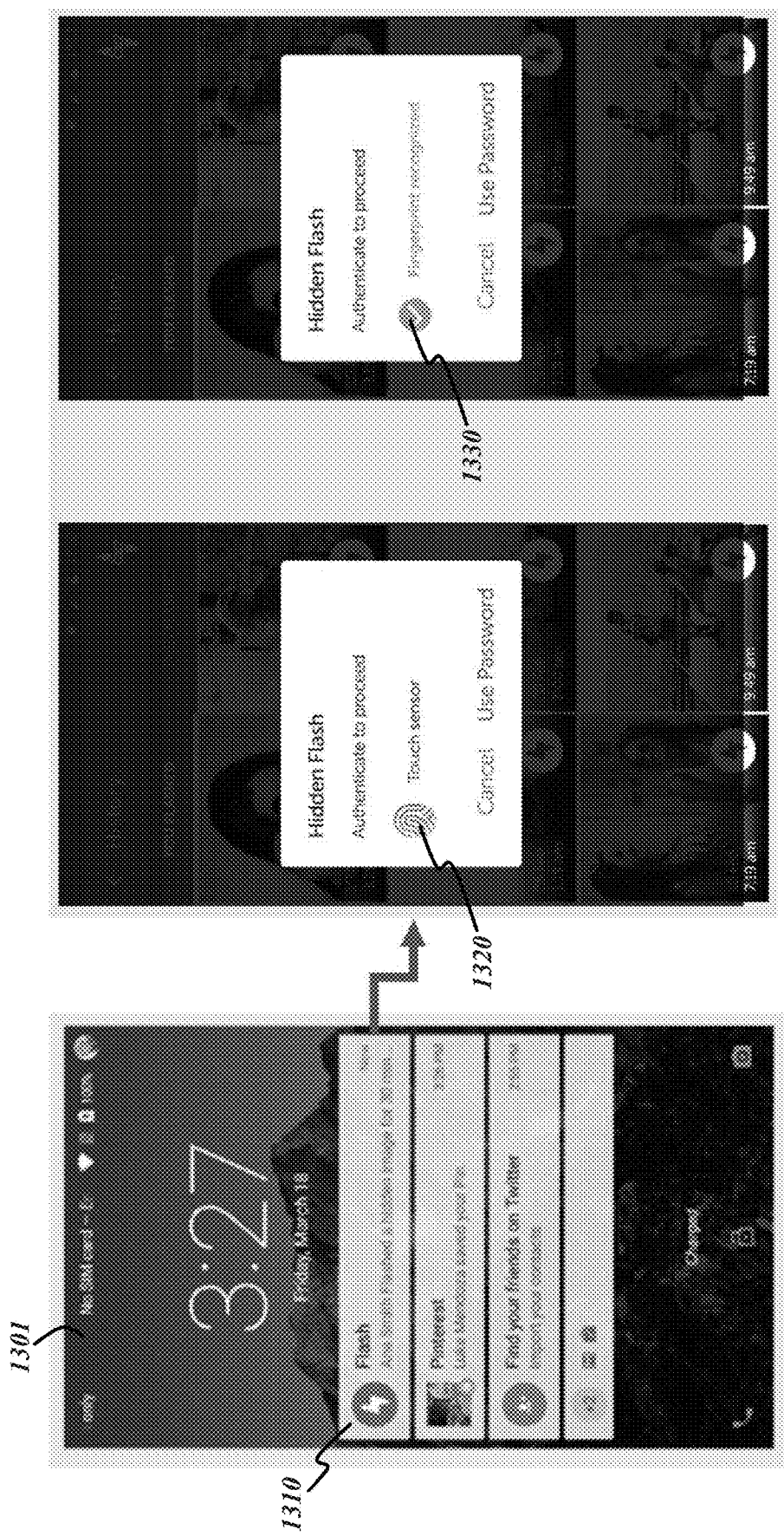
FIG. 4A is a sequence of screenshots of a mobile device belonging to a recipient of the image from among the various mobile devices that connect to the system.

FIG. 4A shows three consecutive screenshots of another one of the various mobile devices that connects to the system 100, which in this example, is the mobile device of the recipient of the submission request. The example of FIG. 4A shows the mobile device at three consecutive stages during a user's receipt of a push notification 1310 regarding the sender's submission request of FIGS. 3A and 3B. The user's (i.e. the recipient's) experience may begin at a lock screen 1301 of the mobile device as shown in the left-most screenshot of FIG. 4A or other screen (e.g. notification center) where push notifications 1310 are displayed. Alternatively, the experience may begin as a popup overlaying any screen of the mobile device (e.g. the user may be in the middle of using an unrelated application). As shown, a push notification 1310 corresponding to the sender's submission request is displayed. The push notification 1310 may include the name ("Flash") and icon of the mobile application 1100, the time of day that the push notification 1310 was received ("Now"), and the content of the push notification 1310 ("Ana Smith Flashed a hidden image for 30 min . . . "). Because the recipient can see that the push notification 1310 was received "Now" (e.g. within the last minute), the recipient may know that about 30 minutes remain to view the hidden image that Ana Smith has sent. If the time that the push notification 1310 was received was about 5 minutes ago, the recipient may know, for example, that about 25 minutes remain to view the hidden image. If the recipient would like to open the mobile application 1100 and view the image, the recipient may swipe or otherwise interact with the push notification 1310 according to the ordinary procedure for unlocking and navigating to an application on the mobile device according to the mobile device's operating system. It is contemplated that the content of the push notification 1310 may depend on the amount of time remaining to view the hidden image. For example, when a certain amount of time or percent of the set time period remains to view the image (e.g. 5 minutes, 10%, etc.), an additional push notification 1310 may be sent saying, for example, "See the hidden Flashed image before it's gone." When the time period has expired, another push notification 1310 may be sent saying, for example, "The hidden image John Flashed expired without being viewed."

In response to the recipient's interacting with the push notification 1310, the mobile device may display an authentication prompt 1320 prompting the recipient to use a fingerprint sensor of the mobile device for authentication, followed by an authentication success notification 1330 after a successful authentication using the fingerprint sensor. In case the recipient prefers to authenticate by password, a "Use Password" button may be provided. A "Cancel" button may also be provided if the recipient no longer wishes to open the mobile application 1100 and would rather return to the lock screen 1301.

FIG. 4B shows two further consecutive screenshots of the mobile device of the recipient of the submission request. The left-most screenshot of FIG. 4B is an example of a password prompt 1340 and password entry tool 1350 by which the recipient may enter a password for authentication following tapping of the "Use Password" button shown in FIG. 4A. After authentication of the recipient, either by fingerprint authentication or password authentication, the mobile application 1100 may launch directly to a screen for viewing the image referred to in the push notification 1310, i.e. the "flashed" image that is available for a limited time for the recipient's viewing. An example of this is shown in the right-most screenshot of FIG. 4B, where the mobile application 1100 has now been launched on the recipient's mobile device directly from the push notification 1310. The example shown in the right-most screen shot of FIG. 4B shows an image viewing screen 1205 of the user interface 1200, including a view 1260 of the flashed image and a timer 1270 showing remaining time for viewing the flashed image. When the timer 1270 expires, the mobile application 1100 may automatically navigate to another screen of the user interface 1200 (e.g. the contacts screen 1201 of FIG. 3A). Alternatively, the image viewing screen 1205 may still be displayed but with the view 1260 of the flashed image removed so that it can no longer be viewed by the recipient. Along the same lines, while the flashed image is available for viewing, the mobile application 1100 can make the image un-savable and screen-shot proof. For example, the mobile application 1100 may inhibit the save or screenshot function of the mobile device's operating system or may display the image in a way that distorts still captures (e.g. by temporal dithering). It is also contemplated that the sender of the flashed image can be notified regarding the recipient's viewing, saving, or screenshotting the image. For example, the system 100 may send a push notification to the sender saying, for example, "John has seen the hidden image you Flashed" or "Ana Smith has screenshotted a photo you Flashed."

Figure 5:
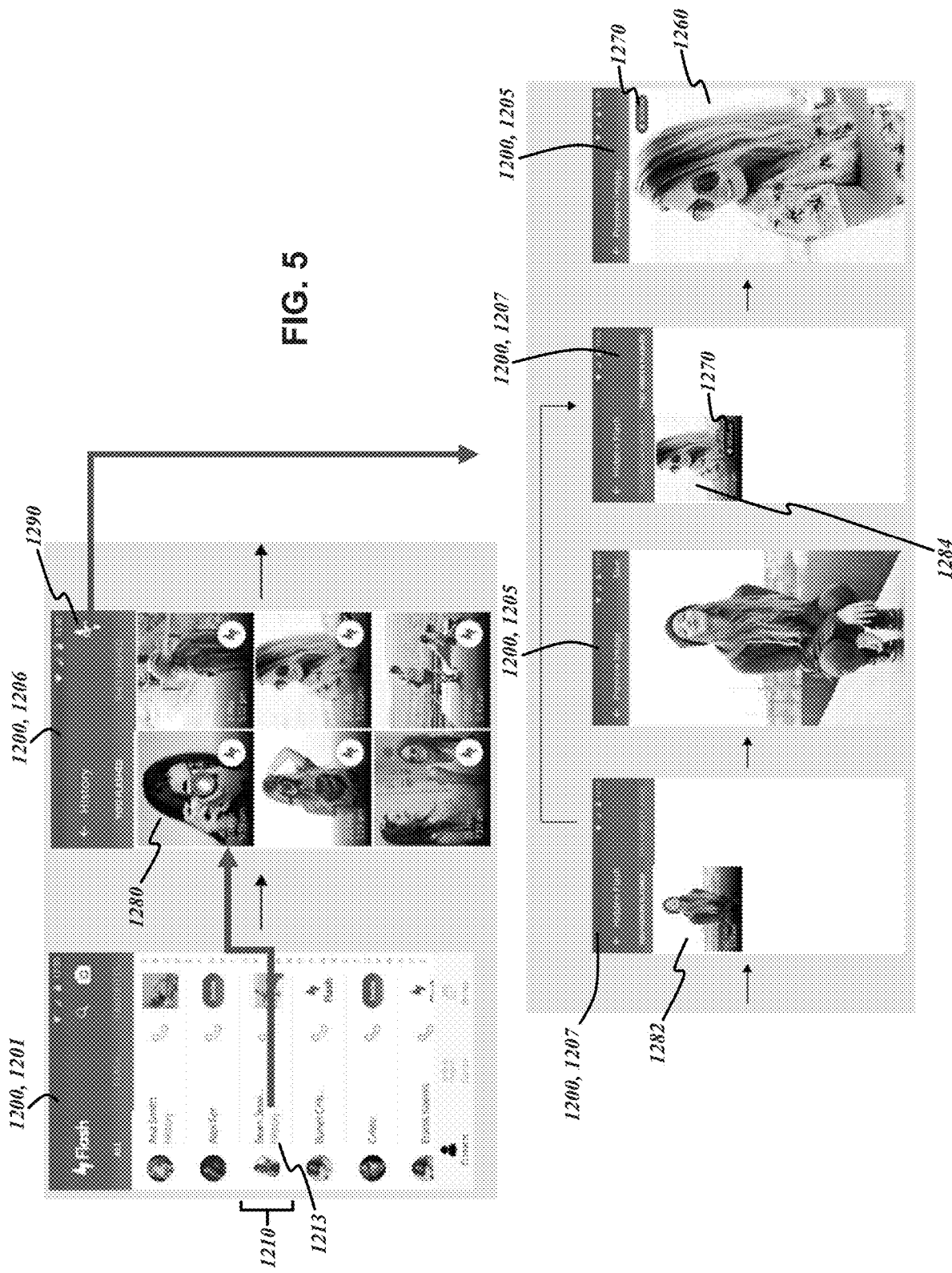
FIG. 5 is another sequence of screenshots showing the user interface of the mobile application running on the recipient's mobile device.

FIG. 5 shows an alternative sequence of screenshots by which the recipient of the submission request may view the flashed image. Instead of launching the mobile application 1100 from a push notification 1310, the recipient may manually launch the mobile application 1100 (e.g. by tapping on an icon for the mobile application 1100 on a home screen of the mobile device). From within the mobile application 1100, the recipient may begin at a contacts screen 1201 of the user interface 1200 as shown in the first (upper-left) screenshot of FIG. 5, which may be the same as the contacts screen 1201 of FIG. 3A. By tapping a history button 1213 associated with a particular contact ("Bean Jessi . . . ") listed as an item 1210 of the list of contacts, the user may navigate to a history screen 1206 of the user interface 1200 as shown in the second (upper-right) screenshot of FIG. 5. The history screen 1206 may be associated with the particular contact whose history button 1213 was tapped and may include one or more grids of thumbnail images 1280 that the user (i.e. the recipient in this case) has sent to or received from that contact using the mobile application 1100. For example, a grid of thumbnail images 1280 that the user has sent to that contact may be displayed when a "You Flashed" tab is selected, while a separate grid of thumbnail images 1280 (not shown) that the user has received from that contact may be displayed when a "They Flashed" tab is selected.

It should be noted that the mobile application 1100 may support two different kinds of image sharing, regular flashed images and hidden flashed images. Referring back to FIG. 3A, the image selection screen 1202 of the user interface 1200 may include, in addition to the hidden flash button 1230, a regular flash button 1232 that allows the sender to send a selected image 1220 without a time period for viewing. Referring again to FIG. 5, the grids of thumbnail images 1280 displayed under the "You Flashed" and "They Flashed" tabs of the history screen 1206 may represent images sent as regular flashed images (e.g. using the regular flash button 1232). Thus, these thumbnail images 1280 may remain available for viewing indefinitely and may be displayed without any timer 1270, but with time and date information indicating when the images were sent.

Wishing to view hidden flashed images, the user (i.e. recipient in this case) may tap a hidden flash history button 1290 to navigate to a hidden flash history screen 1207 of the user interface 1200 as shown in the third or fifth screenshot (first or third screenshot of bottom row) of FIG. 5. Just like the history screen 1206, the hidden flash history screen 1207 may be associated with the particular contact whose history button 1213 was tapped. When a "You Hidden Flashed" tab is selected as shown in the third screenshot of FIG. 5, the hidden flash history screen 1207 may display a grid of thumbnail images 1282 that the user (i.e. the recipient in this case) has sent to the associated contact using the hidden flash functionality of the mobile application 1100 (e.g. using the hidden flash button 1230 shown in FIG. 3A). When a "They Hidden Flashed" tab is selected as shown in the fifth screenshot of FIG. 5, the hidden flash history screen 1207 may display a grid of thumbnail images 1284 that the user has received as hidden flashed images from that contact using the hidden flash functionality of the mobile application 1100. As shown, each thumbnail image 1284 under the "They Hidden Flashed" tab may include a timer 1270 showing how much time remains to view the image before its time period for viewing expires. In contrast, each thumbnail image 1282 under the "You Hidden Flashed" tab may remain on the hidden flash history screen 1207 and be accessible for viewing indefinitely without expiring (though it is contemplated that such sent hidden images may also expire, depending on user preferences).

As shown in the sixth (bottom-right) screenshot of FIG. 5, tapping the thumbnail image 1284 under the "They Hidden Flashed" tab of the hidden flash history screen 1207 may navigate the user interface 1200 to the same image viewing screen 1205 as shown in FIG. 4B, including a view 1260 of the flashed image and a timer 1270 showing remaining time for viewing the flashed image. When the timer 1270 expires, the user interface 1200 may automatically navigate to another screen (e.g. the hidden flash history screen 1207). Alternatively, the image viewing screen may still be displayed but with the view 1260 of the flashed image removed. Similarly, as shown in the fourth screenshot of FIG. 5 (second screenshot of the bottom row), tapping the thumbnail image 1282 under the "You Hidden Flashed" tab of the hidden flash history screen 1207 may navigate the user interface 1200 to a similar image viewing screen 1205 for viewing the full-size image represented by the thumbnail 1282.

It is contemplated that the mobile application 1100 may be configured to require user authentication when a user attempts to access the hidden flash history screen 1207 by tapping the hidden flash history button 1290. Thus, when the user taps the hidden flash history button 1290, the mobile device may display an authentication prompt 1320 and authentication success notification 1330 as shown in FIG. 4A and/or a password prompt 1340 and password entry tool 1350 as shown in FIG. 4B. After authentication of the user, either by fingerprint authentication or password authentication, the mobile application 1100 may proceed from the history screen 1206 to the hidden flash history screen 1207 as shown in FIG. 5.

Figure 6:
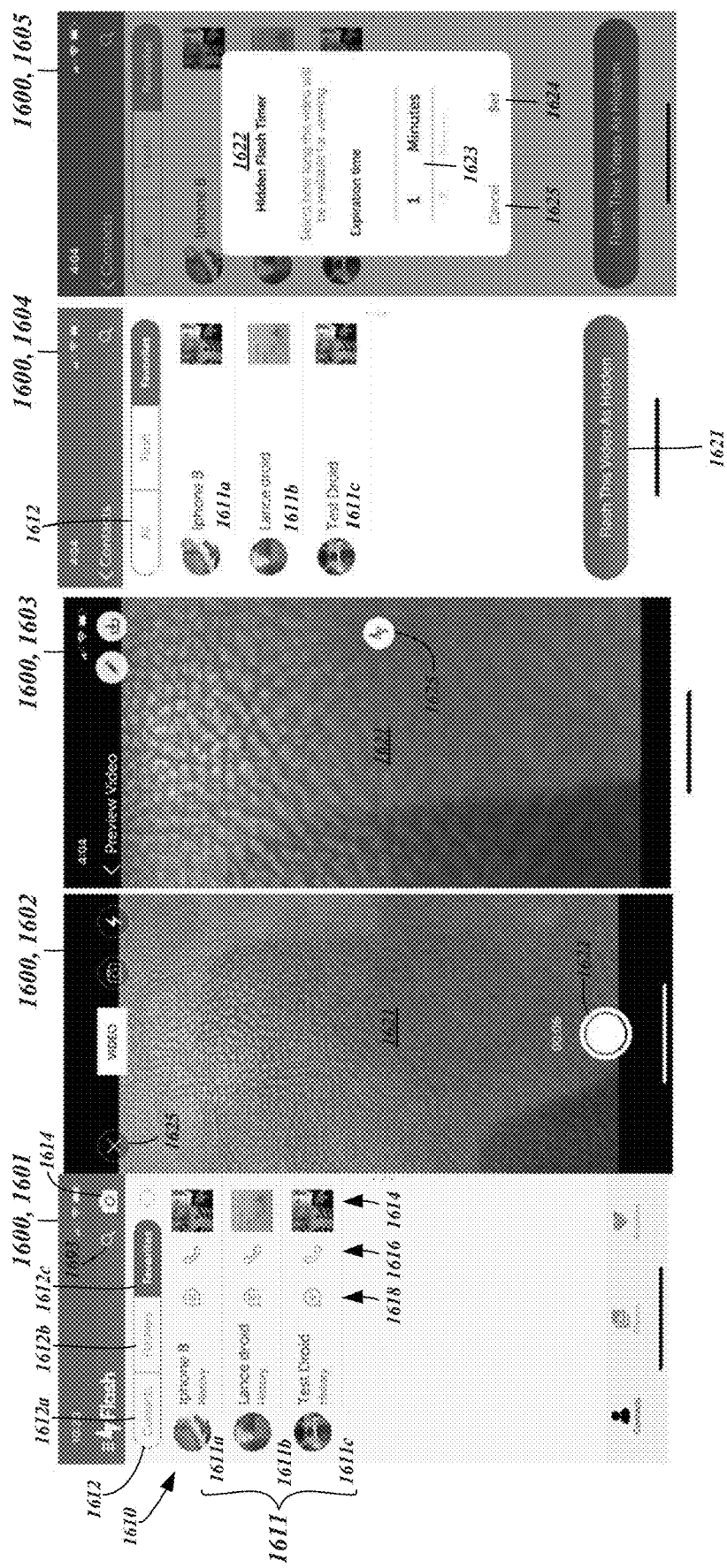
FIG. 6 is a sequence of screenshots showing the user interface of the mobile application on a sender's mobile device implementing time-limited, secure video sharing in accordance with another embodiment of the present disclosure.

The mobile application 1100 may additionally support secure video sharing with time limitations that are enforced through the system 100. FIG. 6 shows a user interface 1600 of the mobile application 1100 as presented to sending/originating mobile device. As indicated above, the mobile device connects to the system 100 for performing the various steps contemplated herein, with each of the examples shown depicting the five consecutive stages during the selection, creation, and transmission of video content from the mobile device to another mobile device via the system 100.

The first user interface display, that is, the leftmost screen shot, is contemplated to be a contacts screen 1601, which is understood to be similar to or the same as the contacts screen 1201 described above in FIGS. 3A and 3B. In this regard, the contacts screen 1601 presents a listing of the contacts 1610 stored on the mobile device and associated with the user.

The contacts screen 1601 includes a selection interface 1612 that narrows the listing of contacts 1601 that fit the selection. For example, there is a "Contacts" tab 1612a, the selection of which lists all of the contacts 1601 associated with the user, along with a "Flashers" tab 1612b, the selection which lists known users of the mobile application 1100 among all contacts 1601 associated with the user. Further, there is a "Favorites" tab 1612c that shows only a listing of the contacts 1611 designated by the user as being a "favorite." In the illustrated example, the "Favorites" tab 1612 is selected, as indicated by the reversed background/text color. Within this example listing, there are three contacts 1601 shown, including a first contact 1611a identified as "Iphone 8," a second contact 1611b identified as Lance droid," and a third contact 1611c identified as "Test Droid." Functionality for searching the list of contacts may be invoked by selecting a magnifying glass icon 1693. From the contacts screen 1601 as shown in FIG. 6, other functionality of the mobile application 110 may be activated, including a "photos" and "activities."

Each of the contacts 1601 may include a respective thumbnail image or avatar 1614 representing contact, along with a phone button 1616 for initiating a phone call with the contact, and a text message button 1617 for initiating a text message to the contact. As indicated above, the thumbnail image or avatar 1614 may be that of the most recent image that was sent to that contact using the mobile application 1100.

From the contacts screen 1601, the user may select a camera icon 1694 to navigate to a video recording interface 1602. A continuous video display as captured by a camera onboard the mobile device is rendered within a display area 1621, which occupies a substantial portion of the available screen real estate. The video display may be stored to an onboard memory following a shutter button 1622 being activated. The current timestamp of the video is shown overlaid within the display area 1621, and opposite to this an indication that a video is being recorded is shown. Furthermore, to the extent the mobile device includes both a front-facing camera and a rear-facing camera, switching between these two sources is possible with a camera selection button 1622. Along these lines, if the mobile device additionally includes a supplemental light (flash), then a camera flash button 1623 may be activated to turn it on. If the user desires to cancel and discard the recording, or return to the contacts screen 1601, a close button 1624 may be activated. In accordance with one default setting, the duration of the video that can be recorded is six (6) seconds, though this is by way of example only and not of limitation. Any other desirable duration may be set.

Once the video has been recorded, the user interface 1600 transitions to a preview interface 1603. The recorded video is played back within the display area 1621, and if the user is satisfied with the content, it may be sent to a recipient in a manner similar to that of images as described above. Specifically, overlaid on the preview interface 1603 is a transmit button 1625, which may be activated to invoke the next screen of the user interface 1600, that is, the contact selection interface 1604 that is the same presentation as the contact interface 1601. The contact selection interface 1604 includes the selection interface 1612 that narrows the listing of the contacts 1601 that fit the selection. Again, in the illustrated example, the "Favorites" tab 1612 is selected, as indicated by the reversed background/text color thereof. Within this example listing, there are three contacts 1611 shown, including first, second and third contacts 1611a-1611c.

In addition to the listing of the contacts, the contact selection interface 1604 includes an option to select a "hidden transmission" that limits the distribution as well as availability of the recorded video. This limitation is understood to be enforced by the system 100. To activate this feature, a button 1627 may be activated, which invokes an overlay 1622 as shown in the duration selection interface 1605. A graphical user element 1623 which accepts predefined increments of time corresponding to the duration of availability is rendered within the overlay 1622, as well as a set button 1624 that results in an instruction being to the system 100 of the limited availability of the video in conjunction with the upload of the video. Alternatively, the video may be uploaded to the system 100 upon completion of the recording to minimize delays.

Figure 7:
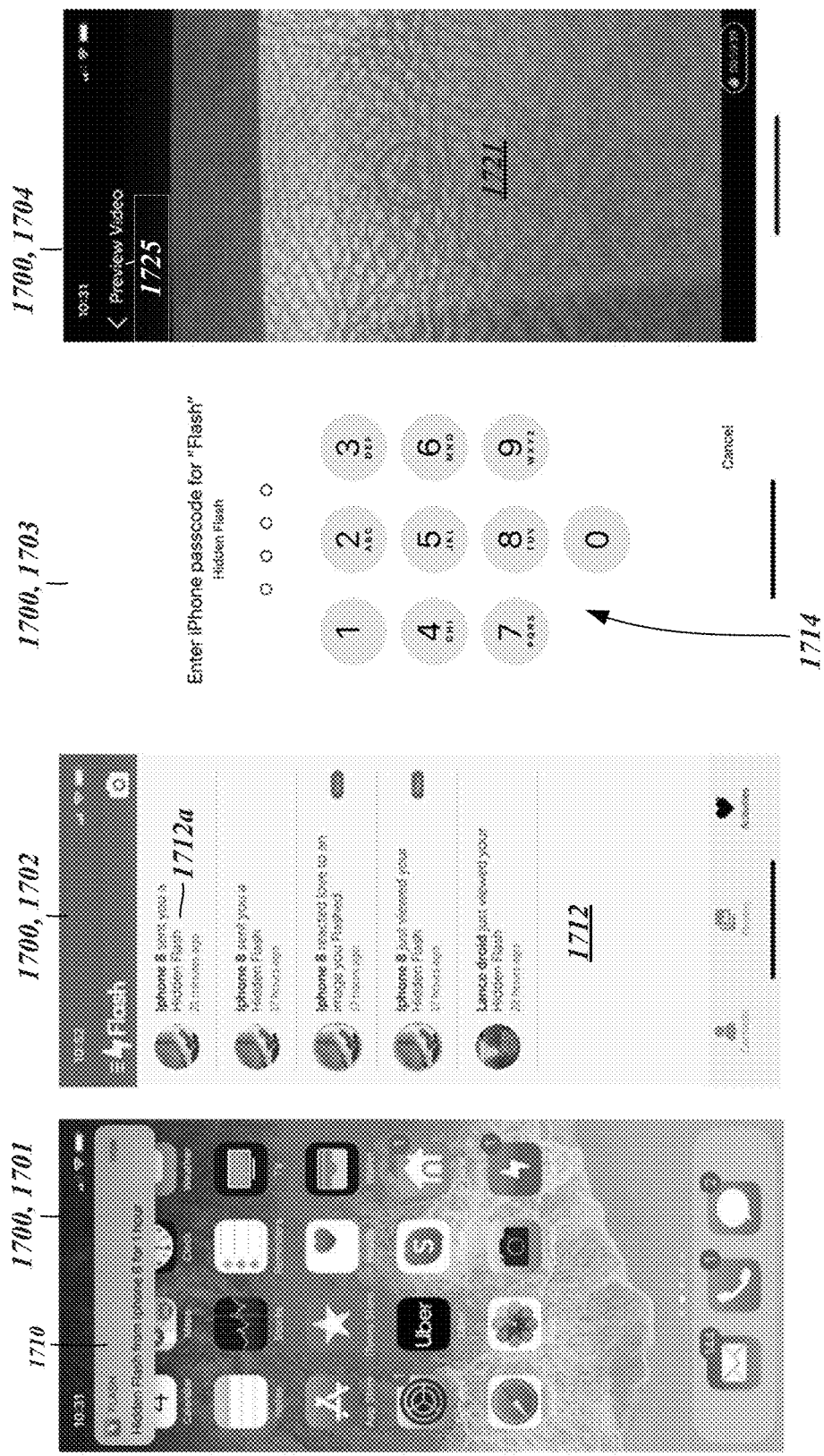
FIG. 7 is a sequence of screenshots showing the user interface of the mobile application on a recipient's mobile device implementing time-limited, secure video sharing.

Upon the video reaching the system 100, the receiving user, that is, the mobile device of such user, is notified that this video is available for viewing. FIG. 7 is shows a user interface 1700 of the mobile application 1100 running one of the mobile devices that connects to the system 100 and is the designated recipient that was selected by the transmitting user as shown in FIG. 6. The basic interface 1701 depicts a typical main icon screen of the mobile device, from which various applications may be invoked. Upon receipt of the notification from the system 100, the mobile device 100 may generate an alert banner 1710 with information specific to the mobile application 1100, along with a description of the notification. In the illustrated example, the fact that the hidden video was transmitted to the user, along with the duration of availability of the video is indicated in the alert, though the contents of this notification may be varied as desired. It is understood that the alert banner 1710 may be generated in other contexts, such as while another application is being executed in the foreground. Furthermore, other types of notifications besides the depicted banner type are known and may be substituted, or used in conjunction with the banner type notification. These include badge notifications that indicate the number of alerts that are associated with a given application, and so forth.

Depending on the specifics of the alert, the mobile application 1100 that generates the alert may be invoked in various ways. The mobile application interface 1702 is one possibility to which execution defaults. As shown, there is a listing of various alerts 1712 that have been generated by the mobile application 1100, including an alert 1712a that is specific to the one generated in response to the hidden video from the sending mobile device 100. Selecting the alert 1712a invokes a password entry interface 1703. According to one embodiment, the password required for unlocking is that which is set for the mobile device 100 itself. Typically, the device unlock code is a four digit numerical code that may be entered via a numerical keypad 1714. However, it is also possible for the password to be specific to the mobile application 1100 as associated with the user on the system 100, or a password that is provided over an alternative channel by the transmitting user. Alternative verification modalities such as facial recognition, fingerprint recognition and the like may be substituted without departing from the scope of the present disclosure. Upon providing the unlock password, the mobile application 1100 transitions to a video viewing interface 1704, which renders the transmitted video within the display area 1721. Like the display area 1621, a timestamp of the current play location may be shown. Upon completion of viewing, the user may invoke a back button 1725 to return to the mobile application interface 1702.

Figure 8A:
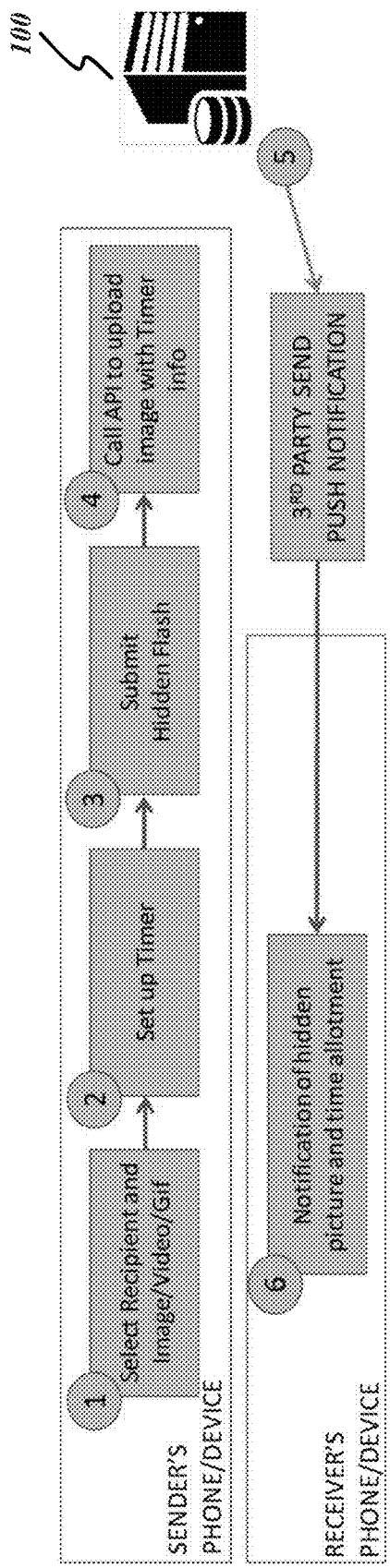
FIG. 8A shows an example operational flow according to an embodiment of the present disclosure.

FIG. 8A shows an example operational flow according to an embodiment of the present disclosure in relation to the system 100 shown in FIGS. 1 and 2 and the sequences of screenshots shown in FIGS. 3A, 3B, 4A, 4B, and 5. The operational flow of FIG. 8A may begin within the sender's mobile device, where the user selects a recipient and image (step 1) as described in relation to the contacts screen 1201 and image selection screen 1202 of the user interface 1200 as shown in FIG. 3A. The recipient may be selected, for example, by tapping the flash button 1218 of the list item 1210 associated with the contact who is the desired recipient, while the image may be selected by tapping the image 1220 followed by the hidden flash button 1230. After selecting the recipient and image (though any order of selecting the recipient, image, and time period is contemplated), the operational flow may continue with the user's setting a time period (step 2) as described in relation to the time period selection screen 1203 of the user interface 1200 as shown in FIG. 3A. The time period may be selected, for example, using radio buttons or other selection tool 1240. When the user is satisfied with the selected recipient, image, and time period, the user may confirm the submission request (e.g. by tapping "Yes" on the time period selection screen 1203), initiating the submission of a hidden flashed image (step 3). The completed submission request, including the image and associated submission data indicative of the recipient and time period, is then uploaded to the system 100 (step 4), for example, using an API such as a standard server interface that supports data transfer over the Internet (e.g. JavaScript Object Notation or JSON).

The operational flow of FIG. 8A continues with the receipt, by the system 100, of the submission request. Upon receipt of the submission request, the system 100 may update the user interface 1200 associated with the recipient indicated by the submission request to make the image of the submission request available for display for the period of time designated by the submission request. The system 100 may, for example, update server-side data to be interpreted by the mobile application 1100 installed on the recipient's mobile device. The system 100 may then send a push notification 1310 to the recipient's mobile device (step 5), the push notification 1310 indicating that the image is available for display for the period of time designated by the submission request. The recipient's mobile device may then display the push notification 1310 (step 6) on a lock screen 1301 as shown in FIG. 4A or other screen (e.g. notification center) where push notifications 1310 are displayed, or as a popup overlaying any screen of the mobile device. If time remains before the image expires, the recipient may view the image by launching the mobile application 1100 directly from the push notification 1310 or by navigating to the image from within the mobile application 1100 as described in relation to FIGS. 4A, 4B, and 5.

Figure 8B:
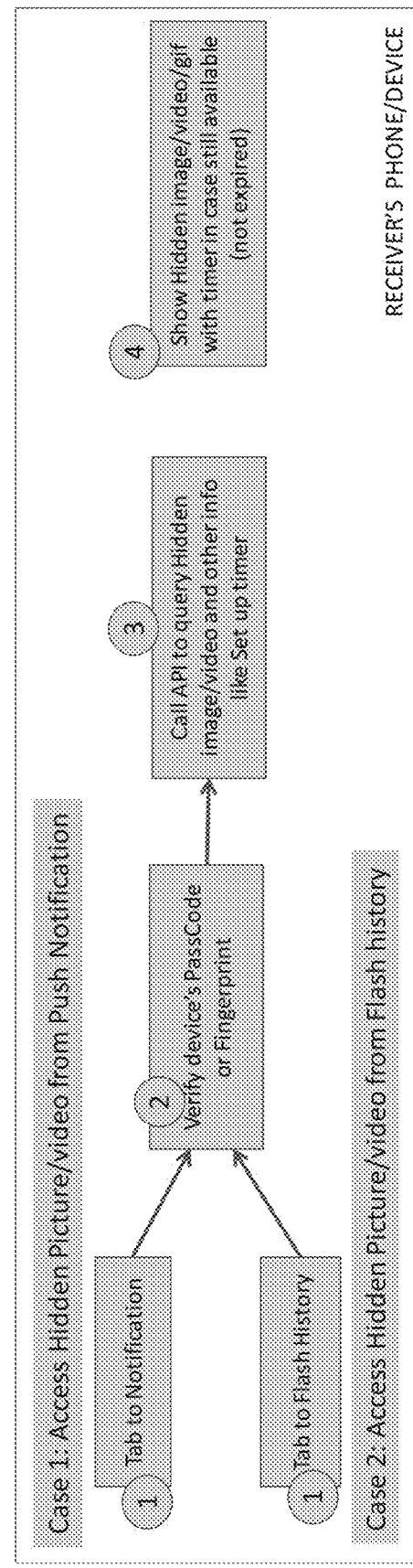
FIG. 8B shows another example operational flow according to an embodiment of the present disclosure.

FIG. 8B shows another example operational flow according to an embodiment of the present disclosure in relation to the system 100 shown in FIGS. 1 and 2 and the sequences of screenshots shown in FIGS. 3A, 3B, 4A, 4B, and 5. The operational flow of FIG. 8B may occur within the recipient's mobile device when the recipient wishes to view the image sent by the sender in FIG. 8A (i.e. the hidden flashed image indicated in the push notification 1310). The operational flow of FIG. 8B may begin (step 1) either with the recipient's interaction with the push notification 1310 as shown in FIG. 4A (Case 1) or with the recipient's interaction with the hidden flash history button 1290 as shown in FIG. 5 (Case 2). In either case, as described above, authentication of the user may be required (step 2), for example, by fingerprint using an authentication prompt 1320 and authentication success notification 1330 as shown in FIG. 4A and/or by passcode using a password prompt 1340 and password entry tool 1350 as shown in FIG. 4B. Following the successful authentication of the recipient of the sent image, the mobile device may query the system 100 for the image and associated time period as set in the sender's submission request (step 3), for example, using an API such as a standard server interface that supports data transfer over the Internet (e.g. JavaScript Object Notation or JSON). In the case of accessing the image directly from the push notification 1310, for example, the query to the system 100 may include an ID of the push notification 1310 that links the push notification 1310 with the sender's submission request. In the case of accessing the image from a history screen 1206 of the mobile application 1200 using the hidden flash history button 1290, the query to the system 100 may locate any submission requests that were uploaded by the user whose history screen 1206 is being viewed and whose submission data indicates the recipient. Having located the correct submission request, the mobile application 1100 may then display the image to the recipient (e.g. on an image viewing screen 1205 of the user interface 1200), along with a timer 1270 showing the remaining viewing time, provided the viewing time has not already expired (step 4).

Figure 9:
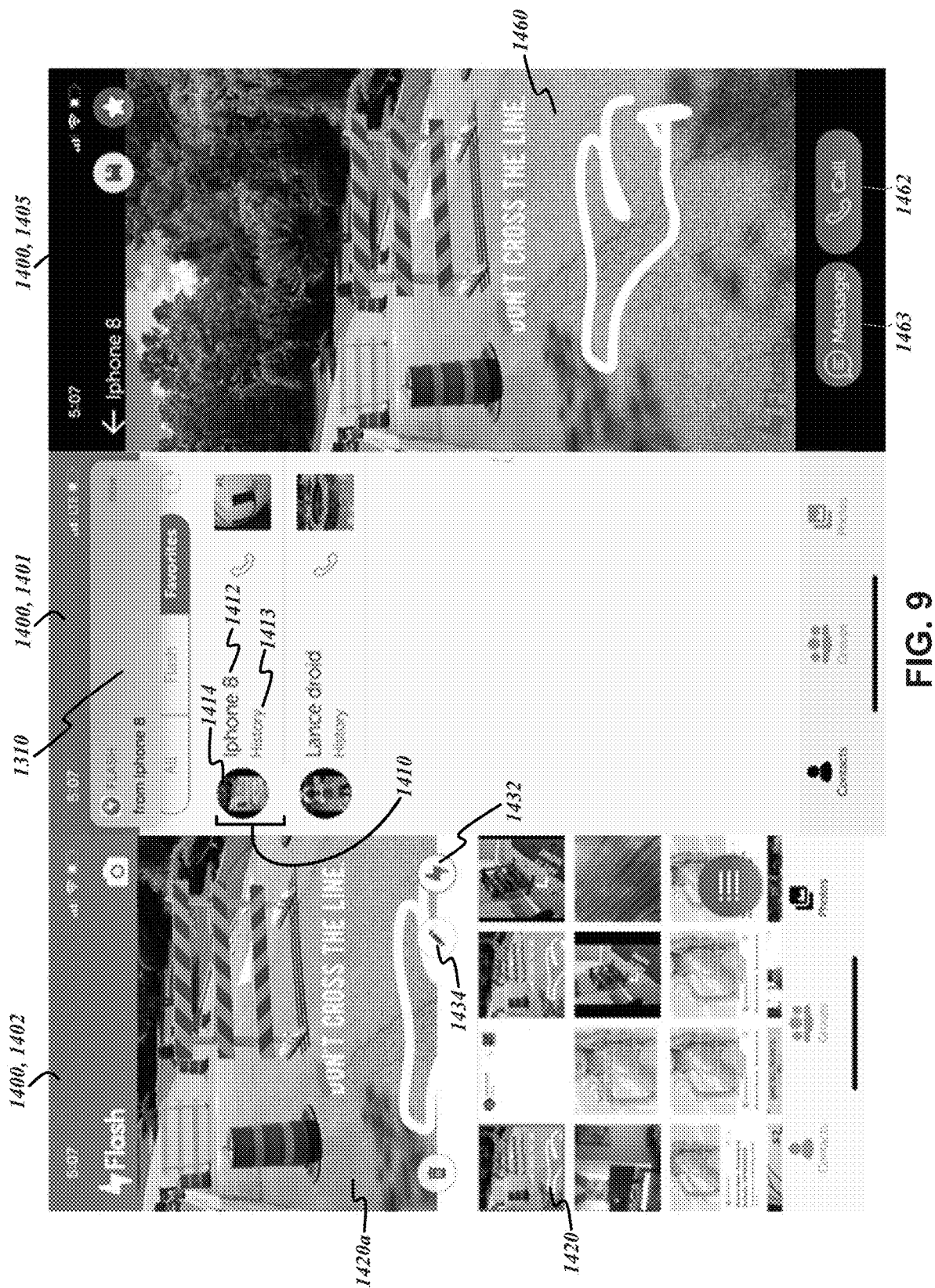
FIG. 9 is a sequence of screenshots showing a user interface of a mobile application running on sender's and receiver's mobile devices from among the various mobile devices that connect to the system.

FIG. 9 shows a user interface 1400 of the mobile application 1100 running on sender and recipient mobile devices connected to the system 100 in three consecutive stages. In the example of FIG. 9, for purposes of illustration, the sender is a customer of some business, municipality, or other service provider. The recipient is the service provider. The left-most screenshot represents the sender's (i.e. customer's) experience in creating a submission request for sending data to the recipient (i.e. service provider). The sender's experience with the user interface 1400 may be the same as the sender's experience with the user interface 1200 described in relation to FIGS. 3A, 3B, and 6A, except as described below.

The left-most screenshot of FIG. 9 depicts an image selection screen 1402 that is the same as the image selection screen 1202 of the user interface 1200 shown in FIG. 3A except that the hidden flash button 1230 is omitted. (It is noted that the hidden flash button 1230 need not be omitted, and that the functionality of the user interfaces 1200 and 1400 may be combined into a single user interface.) Here, as in FIG. 3A, the sender may select an image 1420 from a set of available images 1420 stored locally on the mobile device. The set of images 1420 may, for example, be imported from a photo library on the mobile device and may be displayed as a grid of thumbnail images 1420 as shown. As the sender taps each image 1420, the image 1420 may be marked (e.g. with a colored border) to show that it is the currently selected image 1420. A large view 1420a of the currently selected image 1420 may be displayed as shown.

In the example of FIG. 9, the sender has written the words "DON'T CROSS THE LINE" on the selected image 1420. Such editing of the selected image 1420 may be done using editing tools (e.g. pencil, paintbrush, textbox, graphics, etc.) that may be revealed by tapping the edit button 1434. (As shown in FIG. 3A, an identical edit button 1434 may be available on the image selection screen 1202 of the user interface 1200.) In the context of a customer sending an image to a service provider as described in relation to FIG. 9, the edit button 1434 may allow the sender to provide some explanation or context when sending an image to the service provider. For example, in the case of FIG. 9, the customer has taken a picture of a misplaced traffic barrier that is positioned too far over the yellow center line of a road. The customer has selected the image 1420 to send to the appropriate traffic authority and has edited the image using the edit button 1434 to explain the customer's complaint that the traffic barrier has impermissibly crossed the line.

When the sender is satisfied with the selected image 1420 and any editing of the selected image 1420, the sender may tap the flash button 1432 to proceed with creating the submission request. At this point, the user may be prompted to select various options related to the submission request, such as whether any time period for viewing the image should be associated with the image (e.g. using the time period selection screen 1203 of FIG. 3A, though this functionality may in some cases be limited to hidden flashed images as described above). For purposes of the example of FIG. 9, it is assumed that the sender has opted to include a call request with the image, which may be designated after tapping the flash button 1432 or may be designated by the sender in a settings menu to include a call request generally for all submission requests. The completed submission request may be transmitted to the system 100 and may include the selected image 1420 (e.g. an image file) together with associated submission data indicative of the selected recipient (e.g. the contact whose flash button 1218 was used to initiate the submission request as shown in FIG. 3A) and the designation to include a call request. As described in more detail below, the system 100 will then make the selected image 1420 available for viewing by the recipient, who will then be able to call back the sender with the touch of a button.

The center and right-most screenshots in FIG. 9 show the recipient's (service provider's) mobile device during the recipient's receipt of a push notification 1310 regarding the sender's (customer's) submission request. The recipient's experience may begin at a lock screen 1301 of the mobile device as shown in the left-most screenshot of FIG. 4A or other screen (e.g. notification center) where push notifications 1310 are displayed, or as a popup overlaying any screen of the mobile device. In the example of the center screenshot of FIG. 9, the recipient is currently viewing a contacts screen 1401 (with the "Favorites" tab selected), which may be the same as the contacts screen 1201 of FIG. 3A, when a push notification 1310 corresponding to the sender's submission request appears as a popup. Like the push notification 1310 shown in FIG. 4A, the push notification 1310 of FIG. 9 may include the name ("Flash") and icon of the mobile application 1100, the time of day that the push notification 1310 was received ("Now"), and the content of the push notification 1310 ("from Iphone 8"). If the recipient would like to navigate directly to the image (including launching the mobile application 1100 if necessary), the recipient may swipe, tap, or otherwise interact with the push notification 1310 using the ordinary procedure for navigating to an application on the mobile device via a push notification according to the mobile device's operating system.

In response to the recipient's interacting with the push notification 1310, the user interface 1400 of the mobile application 1100 may navigate directly to a screen for viewing the image referred to in the push notification 1310, i.e. the selected image 1420 sent by the customer named "Iphone 8" in the recipient's contact list (also referred to as the "flashed" image). An example of this is shown in the right-most screenshot of FIG. 9, where an image viewing screen 1405 of the user interface 1400 is shown, including a view 1460 of the flashed image along with any writing and drawing created by the sender using the edit button 1434. Since the flashed image is a regular flashed image in this case, not a hidden flashed image as shown in the image viewing screen 1205 of FIG. 4B, the timer 1270 may be omitted and the flashed image may be available indefinitely. Along the same lines, saving functionality (disk button) and/or favorite functionality (star button) may be provided here to allow the recipient to find and view the image at a later time. Such functionality may be disabled in the case of a hidden flashed image. Together with the flashed image, the image viewing screen 1405 also includes a call button 1462 as specified by the sender's submission request. The recipient (business enterprise) can simply tap the call button 1462 to instantly initiate a phone call with the mobile device of the sender of the flashed image. Instead of calling the mobile device of the sender of the flashed image, it is possible to send a message. In this regard, the image viewing screen 1405 includes a message button 1463 as specified by the sender's submission request. The message may be e-mail, an SMS text message, or any other suitable communication.

Thus it will be appreciated that such phone calls and messages may be generally referred to as a communications interaction that may be initiated.

As shown on the contacts screen 1401, the list item 1410 associated with the contact who sent the submission package (i.e. the customer) has been updated to change the contact's avatar 1414 to the flashed image (including sender's edits). This may allow the recipient (i.e. service provider) to easily associate contacts and call numbers with current customer issues/requests. For example, by simply glancing at the list item 1410 associated with the contact name "Iphone 8," it can be immediately understood that this contact was the person who pointed out the problem involving the traffic barrier.

Figure 10A:
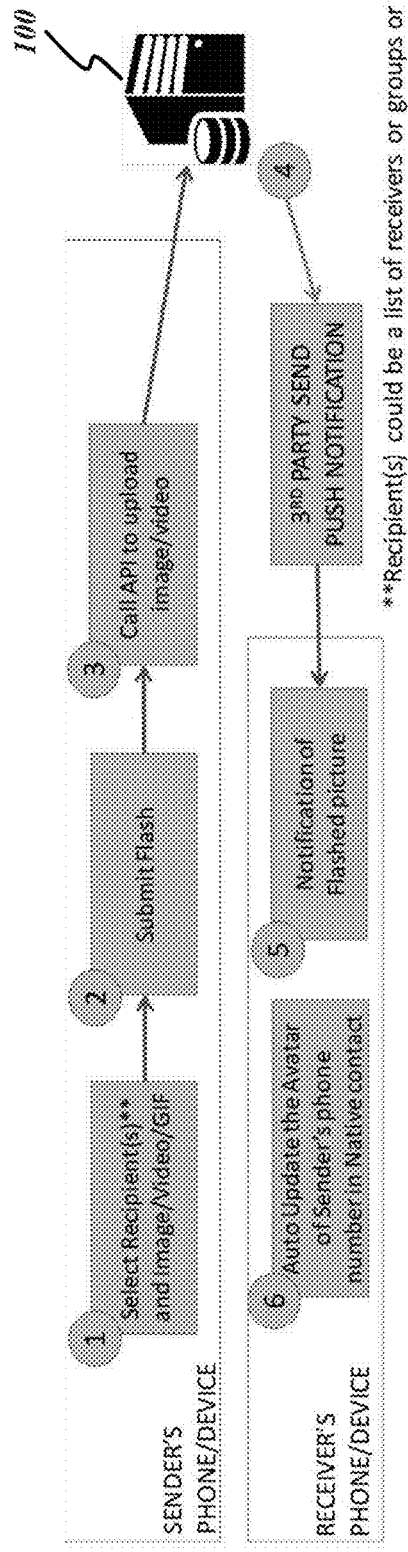
FIG. 10A shows another example operational flow according to an embodiment of the present disclosure.

FIG. 10A shows an example operational flow according to an embodiment of the present disclosure in relation to the system 100 shown in FIGS. 1 and 2 and the sequence of screenshots shown in FIG. 9. The operational flow of FIG. 10A may begin within the sender's (customer's) mobile device, where the sender selects a recipient and image (step 1) as described in relation to the image selection screen 1402 of the user interface 1400 as shown in FIG. 9. As noted above, selecting a recipient may be the same as described in relation to the contacts screen 1201 of FIG. 3A (e.g. tapping the flash button 1218 of the list item 1210 associated with the contact who is the desired recipient). The image may be selected, for example, by tapping the image 1420 followed by the flash button 1432. After selecting the recipient and image, the operational flow may continue with the submission of a flashed image with call request (step 2), though the call request itself may be a default setting for that user. The completed submission request, including the image and associated submission data indicative of the recipient, is then uploaded to the system 100 (step 3), for example, using an API such as a standard server interface that supports data transfer over the Internet (e.g. JavaScript Object Notation or JSON).

The operational flow of FIG. 10A continues with the receipt, by the system 100, of the submission request. Upon receipt of the submission request, the system 100 may update the user interface 1400 associated with the recipient (i.e. service provider) indicated by the submission request to make the image of the submission request available for display. The system 100 may, for example, update server-side data to be interpreted by the mobile application 1100 installed on the recipient's mobile device. The system 100 may then send a push notification 1310 to the recipient's mobile device (step 4), the push notification 1310 indicating that the image is available for display. The recipient's mobile device may then display the push notification 1310 (step 5) as a popup as shown in FIG. 9 (or on a lock screen 1301 as shown in FIG. 4A or other screen where push notifications 1310 are displayed). As described above, the recipient's mobile device may also update the avatar 1414 of the sender (i.e. customer) in the mobile device's native contacts list and/or in the contacts list of the contacts screen 1401 of the mobile application 1100 (which may be an import of the device's native contacts list as described above). The recipient may view the image by launching the mobile application 1100 directly from the push notification 1310 or by navigating to the image from within the mobile application 1100 as described in relation to FIGS. 4A, 4B, and 5.

FIG. 8B shows another example operational flow according to an embodiment of the present disclosure in relation to the system 100 shown in FIGS. 1 and 2 and the sequences of screenshots shown in FIG. 9. The operational flow of FIG. 8B may occur within the recipient's (i.e. service provider's) mobile device when the recipient wishes to view the image sent by the sender (i.e. customer) in FIG. 10A (i.e. the flashed image indicated in the push notification 1310). The operational flow of FIG. 8B may begin (step 1) either with the recipient's interaction with the push notification 1310 (Case 1) or with the recipient's interaction with the history button 1413 (Case 2) shown in FIG. 9 (and as described in relation to FIG. 5). In either case, optionally following the successful authentication of the recipient, the mobile device may query the system 100 for the image and any associated time period as may have been set in the sender's submission request (step 3), for example, using an API such as a standard server interface that supports data transfer over the Internet (e.g. JavaScript Object Notation or JSON). In the case of accessing the image directly from the push notification 1310, for example, the query to the system 100 may include an ID of the push notification 1310 that links the push notification 1310 with the sender's submission request. In the case of accessing the image using a history button 1413 of the mobile application 1400, the query to the system 100 may locate any submission requests that were uploaded by the user whose history button 1413 was interacted with and whose submission data indicates the recipient. Having located the correct submission request, the mobile application 1100 may then display the image to the recipient (e.g. on an image viewing screen 1405 of the user interface 1400), along with the call button 1462 or message button 1463 (step 4). The call button 1462 or message button 1463 may be embedded in the image.

Figure 10B:
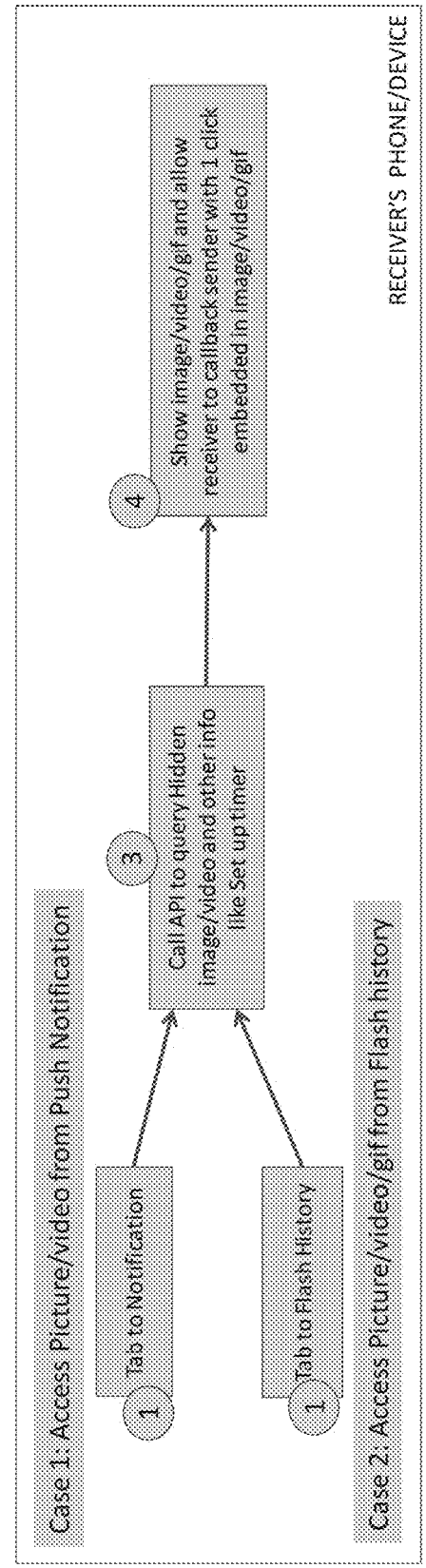
FIG. 10B shows another example operational flow according to an embodiment of the present disclosure.
Figure 11A:
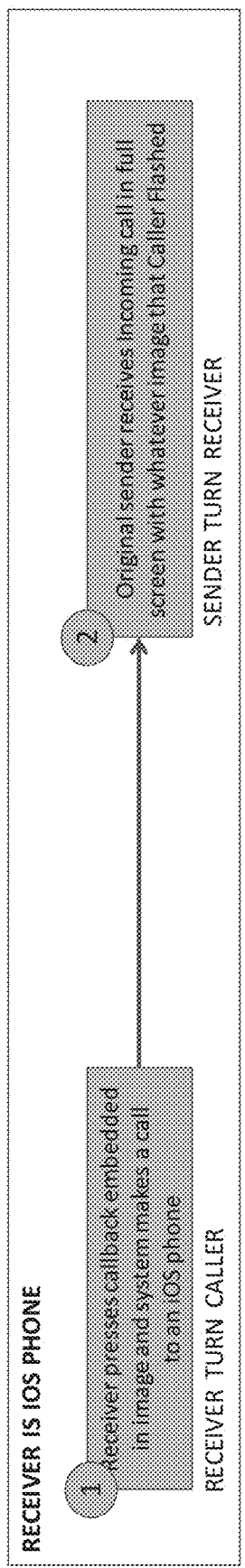
FIG. 11A shows another example operational flow according to an embodiment of the present disclosure.

FIG. 11A shows another example operational flow according to an embodiment of the present disclosure in relation to the system 100 shown in FIGS. 1 and 2 and the sequence of screenshots shown in FIG. 9. The operational flow of FIG. 11A may begin within the recipient's (i.e. service provider's) mobile device immediately following the operational flow of FIG. 10B. While viewing the flashed image on the image viewing screen 1405 of the user interface 1400, the recipient may tap the call button 1462 to initiate a phone call with the mobile device of the sender directly from within the mobile application 1100 (step 1). The operational flow may continue with the sender's (i.e. customer's) mobile device receiving the phone call initiated by the recipient (i.e. service provider) along with a full screen view of the image that was part of the sender's (i.e. customer's) submission request (step 2), e.g. the image of the misplaced traffic barrier. For example, in the case of a mobile device using an iOS® operating system, the sender's creation/upload of the submission request (e.g. step 2 of FIG. 10A) may cause the mobile application 1100 to update the sender's native contact settings to replace the avatar of the recipient with the image of the submission request. Then, when the sender's mobile device receives the incoming call from the recipient in step 2 of FIG. 11A, the mobile device will display the image together with the incoming call.

Figure 11B:
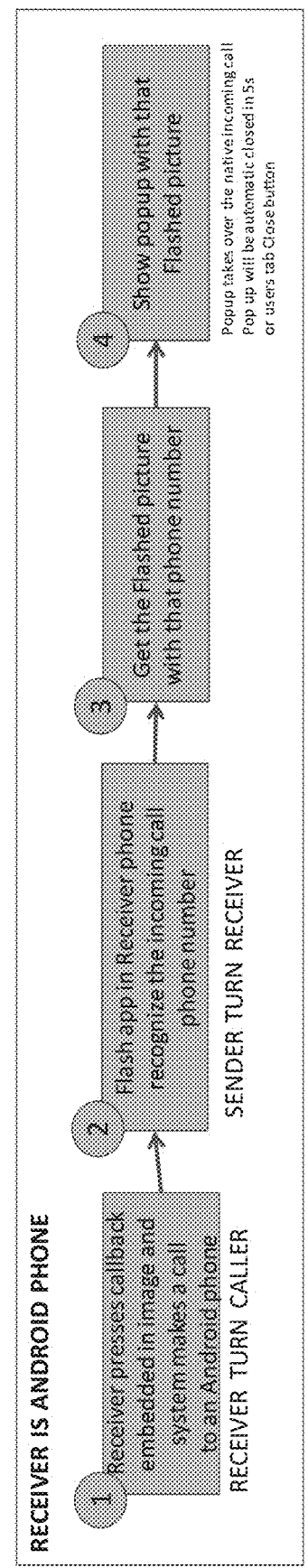
FIG. 11B shows another example operational flow according to an embodiment of the present disclosure.

In the case of a mobile device using an Android® operating system, the operational flow of FIG. 11B may be used. In this case, after the recipient (i.e. service provider) taps the call button 1462 to initiate a phone call with the mobile device of the sender (step 1), the mobile application 1100 in the sender's (i.e. customer's) mobile device may recognize the incoming call phone number as being the phone number of the recipient associated with a flashed image (step 2). The mobile application 1100 may then retrieve the locally stored copy of the flashed image associated with that phone number (step 3) and display a popup of the image while the phone call is incoming, i.e. before the sender (i.e. customer answers the phone (step 4). The popup may be set to automatically close after a period of time (e.g. five seconds) and/or in response to user interaction with a "close" button.

By displaying the sender's own flashed image on the sender's mobile device when the recipient calls back the sender, the sender can immediately be reminded of what the call is concerning. For example, the sender may see the image shown in FIG. 9 and recognize that the call pertains to the misplaced traffic barrier.

In the above description of FIGS. 7, 8A, 8B, 9A, and 9B, an example is provided in which the sender of the flashed image is a customer and the recipient of the flashed image is a service provider. In this context, the customer may easily point out something to the service provider (e.g. the misplaced traffic barrier described above, a broken or missing part of a home/auto system or appliance, etc.). However, the disclosure is not limited to these particular roles of the sender and recipient. For example, it is also contemplated that the sender of the flashed image may be the service provider and the recipient may be the customer. For example, a service provider with which the customer has an upcoming appointment (e.g. a dentist, an auto shop, etc.) may use the mobile application 1100 to send an appointment reminder to the customer, replacing conventional SMS notifications with visual notifications including a picture and data. The view 1460 of the flashed image may be an image of the appointment reminder itself (e.g. an image of a calendar with a marked appointment) or an image related to the subject of the appointment (e.g. the customer's car) with overlaid text detailing the appointment reminder. In addition to the call button 1462, which may be used by the customer to call the service provider to reschedule the appointment, additional buttons may be provided to confirm or cancel the appointment. For example, the recipient may be given options to tap on left to confirm, tap on right to cancel, or tap the call button 1462 to call and reschedule. It is also contemplated that the timer 1270 described above in relation to FIGS. 3A-6B can be used in the customer/service provider setting, with the timer 1270 applying to an image or other media sent in either direction. For example, a financial institution (e.g. a bank) or other service provider enterprise may use the mobile application 1100 to send secure, time sensitive messages to a customer or simultaneously to several of their customers. Likewise, a customer can send a secure, time sensitive message to the service provider enterprise, such as a temporary authorization that expires according to the timer 1270.

Referring back to the diagram of FIG. 2, although the foregoing embodiments contemplate an implementation with the mobile application 1100 running on each of the mobile devices (e.g., smartphones) connecting to the system 100, another embodiment of the present disclosure contemplates an implementation with a native call controller 1110 of the mobile device. As referenced herein, the native call controller 1110 is understood to be a software component of the mobile device operating system that initiates the placement of outgoing calls and acceptance of incoming telephone calls, text messages, and videoconferences. There may be sub-interfaces or panels for inputting the numeric digits of telephone numbers, contact lists, recently placed and received calls, favorite contacts, voicemail, and so forth. Once a call is in progress, the native call controller 1110 may also include features for muting the audio, inputting numeric digits (in the form of touch-tone/DTMF signals), audio output and input sources, adding additional callers, and so forth. Thus, in the context of the illustrated example, the first mobile device may include a native call controller 1110a and a second mobile device may include a native call controller 1110b.

Figure 12A:
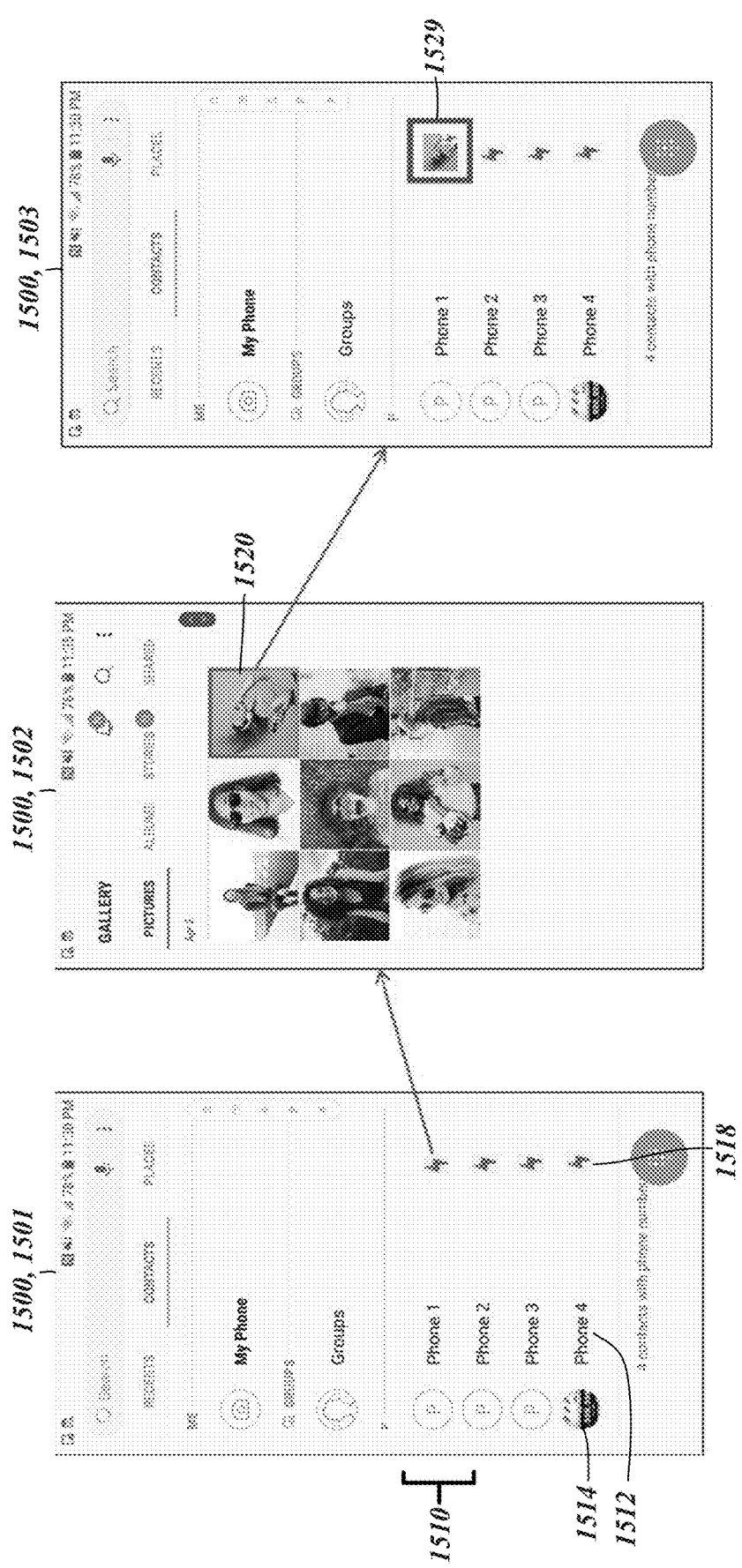
FIG. 12A is a sequence of screenshots showing a user interface of a native call controller of a mobile device belonging to a sender of an image from among the various mobile devices that connects to the system.

Referring now to FIG. 12A, the native call controller 1110 may have a user interface 1500, with the leftmost screen shot thereof depicting a user's (i.e., the sender's) experience of creating a submission request for sending data from the mobile device to another mobile device via the system 100. Illustrated therein is a contacts screen 1501 showing a list of the sender's contacts (e.g., in alphabetical order). Each item 1510 of the list of contacts may include a name 1512, a thumbnail image or avatar 1514 representing the contact, and a flash button 1518. In the illustrated example, selecting the name 1512 and/or the avatar 1514 is understood to initiate a phone call with the contact.

Figure 12B:
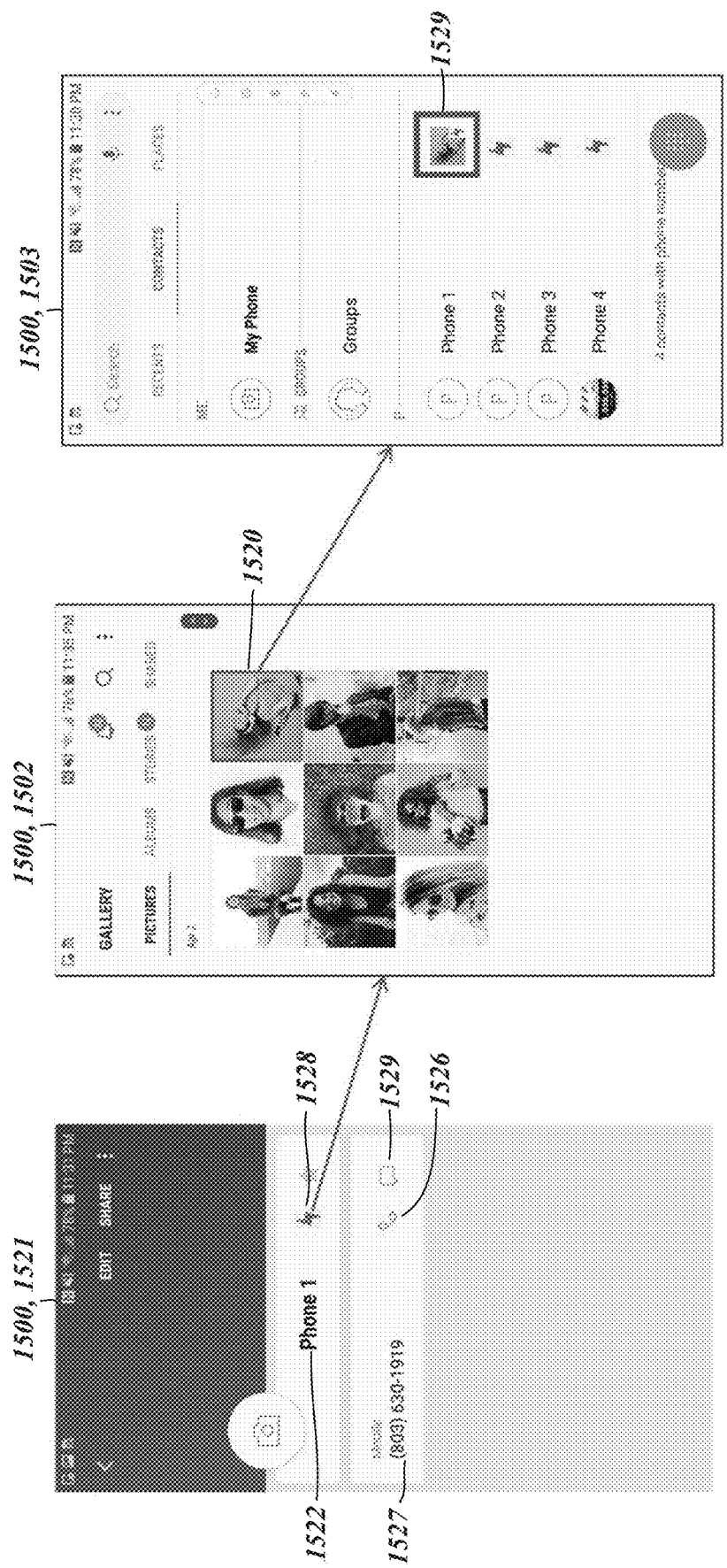
FIG. 12B is another sequence of screenshots showing the user interface of the native call controller running on the sender's mobile device.

Alternatively, selecting the name 1512 and/or the avatar 1514 from the contacts screen 1501 may invoke a detailed contact screen 1521 as shown in the leftmost screen shot of FIG. 12B. In addition to the name 1522 and the avatar 1524 that is the same as in the contacts screen 1501 (e.g., the name 1512 and the avatar 1514, respectively), a phone number 1527 may be listed, along with a phone button 1526 to initiate the phone call with the contact, a text message button 1529 to initiate another interface within the mobile operating system to send and receive SMS text messages, and a flash button 1528 for creating a submission request.

Whether invoked through the flash button 1518 on the contacts screen 1501 or the flash button 1528 on the detailed contact screen, the user interface 1500 may navigate to an image selection screen 1502 as shown in the center screenshot of FIGS. 10A and 10B. The sender may select an image 1520 from a set of available images stored locally on the mobile device. The set of images 1520 may, for example, be imported from a photo library on the mobile device and may be displayed as a grid of thumbnail images, as shown. When the sender taps the desired image 1520, it may be marked (e.g. with a colored border) to show that it is the currently selected one, and this action is understood to create the submission request that assigns the selected image 1520 for the designated contact to receive and/or display in connection with the call that is initiated thereto by the user. The user interface 1500 navigates back to the contacts screen 1503 which now has a thumbnail 1529 of the previously selected image 1520 that is designated or assigned for the contact.

Figure 13:
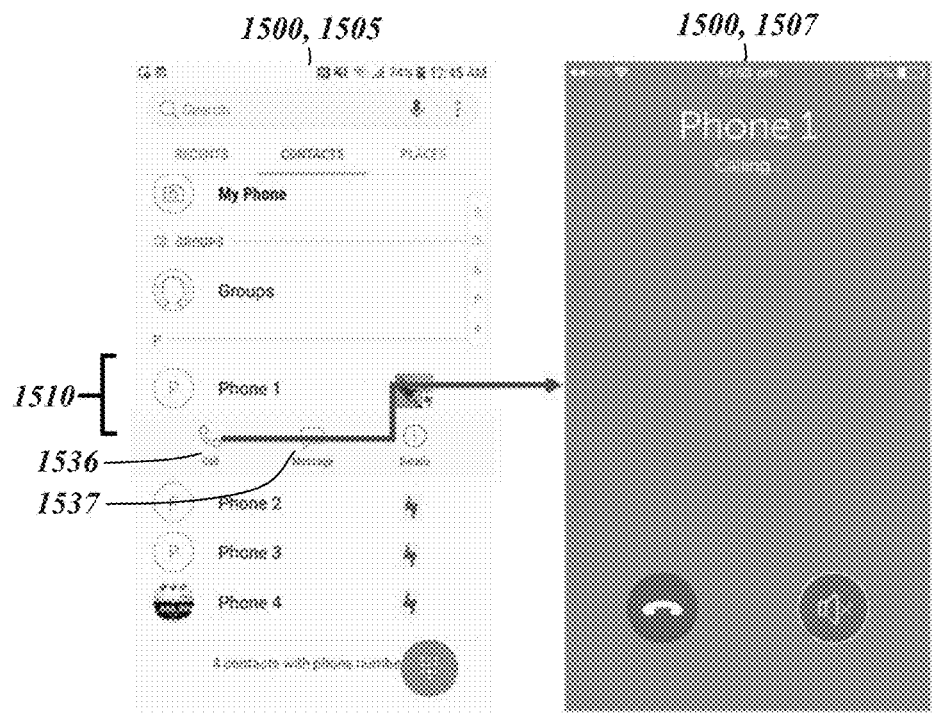
FIG. 13 is a pair of screenshots showing the user interfaces of the native call controller of the mobile device as a call is being placed.

FIG. 13 shows the user interface 1500 of the native call controller 1110, and the left screen shot shows a contacts screen 1505 with a specific call recipient being selected. In further detail, when an item 1510 is selected in the contacts screen 1505, a call button 1536 is presented underneath the item 1510, along with a text message button 1537 and a details button 1538 that, when invoked, presents the detailed contact screen 1521 discussed above with reference to FIG. 12B. Activating the call button 1536 then invokes a call initiation screen 1507. In a conventional implementation of the native call controller 1110, the name of the called contact is displayed, along with a progress indicator, and a buttons to terminate the call or mute the call. Any other graphical elements may be presented on the call initiation screen 1507 in accordance with the implementation of the mobile operating system.

Figure 14:
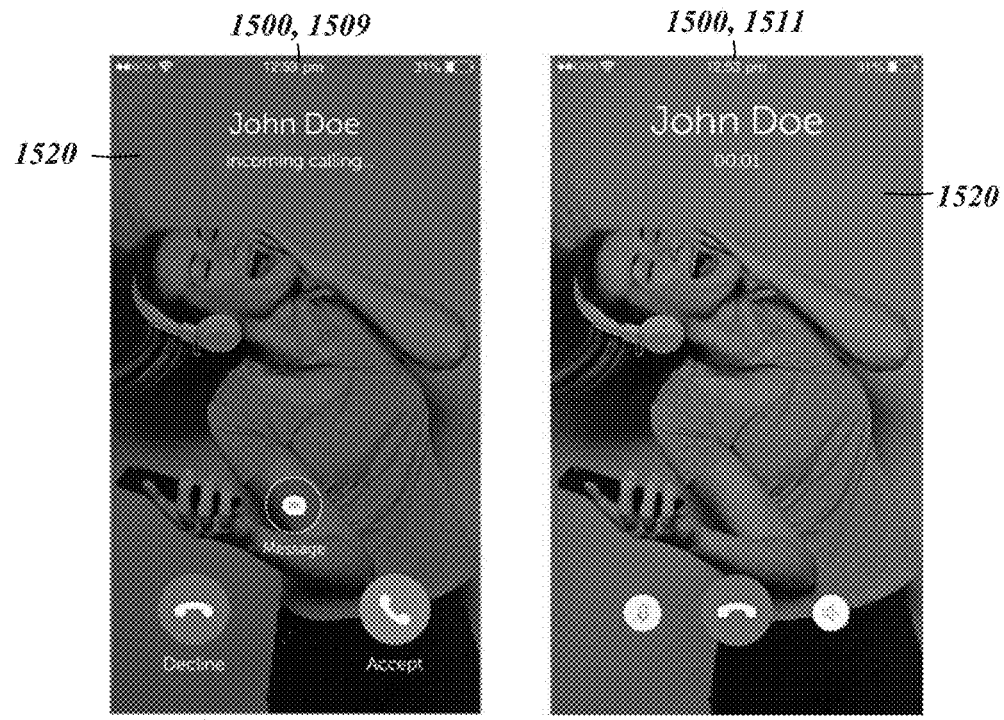
FIG. 14 is a pair of screenshots showing the user interfaces of the native call controller of the mobile device as a call is being received.

Referring to FIG. 14, on the receiving end, e.g., the corresponding native call controller 1110 presents in the user interface 1500 a call receive screen 1509. Displayed as the background of the call receive screen 1509 is the image 1520 as previously selected by the initiating user via the image selection screen 1502. At this juncture, of the incoming phone call, the user has the option of declining or accepting the call, as well as sending a text message reply. Again, these options may depend on the specifics of the mobile operating system, so these are presented by way of example only and not of limitation. Once the call is accepted, a call progress screen 1511 continues to display the image 1520 as selected by the initiating user.

Figure 15:
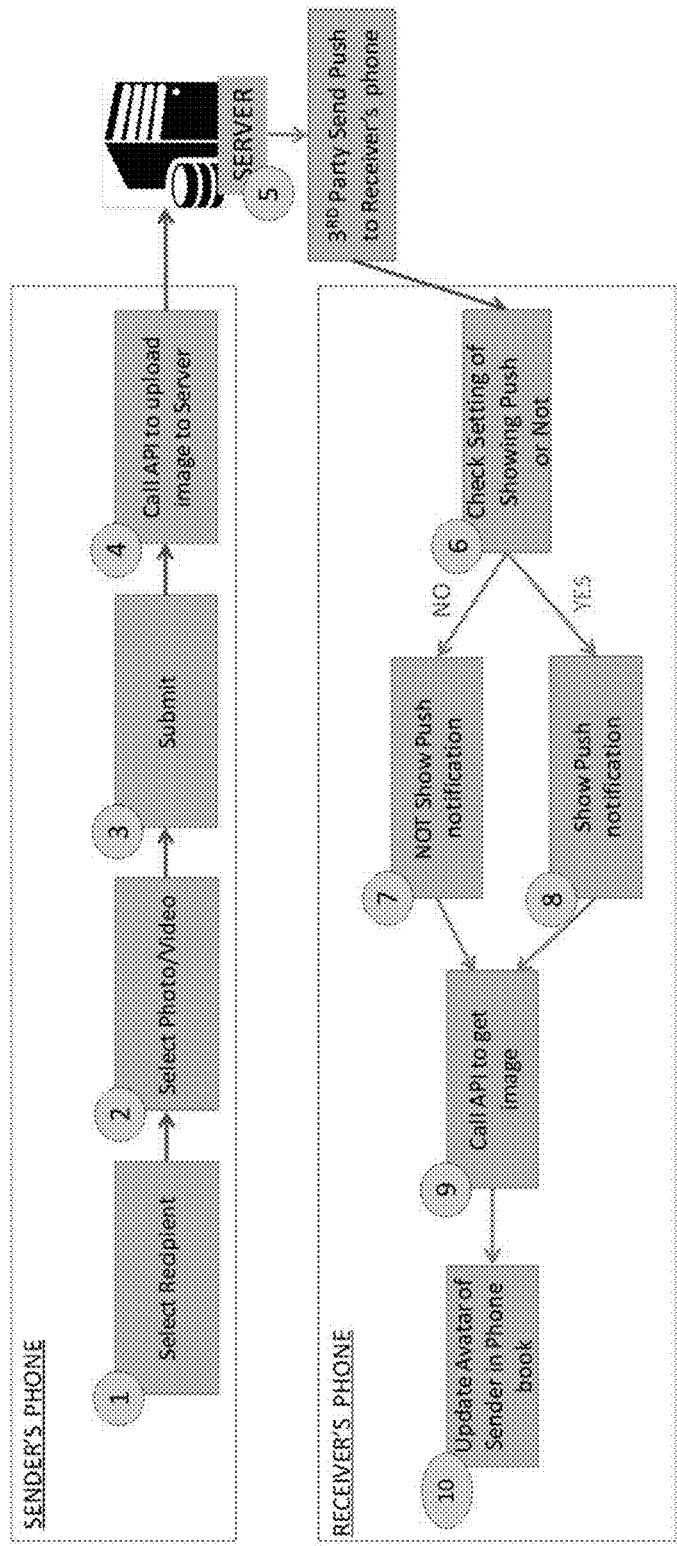
FIG. 15 shows an example operational flow according to an embodiment of the present disclosure.

FIG. 15 shows an example operational flow according to an embodiment of the present disclosure in relation to the system 100 shown in FIGS. 1 and 2 and the sequences of screenshots shown in FIGS. 10A, 10B, 11, and 12. The operational flow of FIG. 13 may begin within the sender's mobile device, where the user selects a recipient and image (step 1) as described in relation to the contacts screen 1501 and the detailed contact screen 1521 on one hand, and the image selection screen 1502 of the user interface 1500 on the other hand, as shown in FIGS. 12A and 10B. The recipient may be selected, for example, by tapping the flash button 1518 of the list item 1510 associated with the contact who is the desired recipient, or the flash button 1528 in the detailed contact screen 1521 for the specific contact. The image may be selected by tapping the image 1520 (step 2). With the recipient and the image being selected, the submission may be initiated. The completed submission request, including the image and associated submission data indicative of the recipient is then uploaded to the system 100 (step 4), for example, using an API such as a standard server interface that supports data transfer over the Internet (e.g. JavaScript Object Notation or JSON).

The operational flow of FIG. 15 continues with the receipt, by the system 100, of the submission request. Upon receipt of the submission request, the system 100 may update the user interface 1500 associated with the recipient indicated by the submission request to make the image of the submission request. The system 100 may, for example, update server-side data, and then send a push notification to the recipient's mobile device (step 5). On the recipient's mobile device, the operational flow may continue with first checking the setting for displaying or hiding a push notification (step 6). The push notification is hidden (step 7) or shown (step 8) to the extent user settings so dictate either way. The native call controller 1110 retrieves the image via an API request (step 9), and the avatar 1514 associated with the sending user may be updated in the mobile device's native contacts list (step 10).

Figure 16:
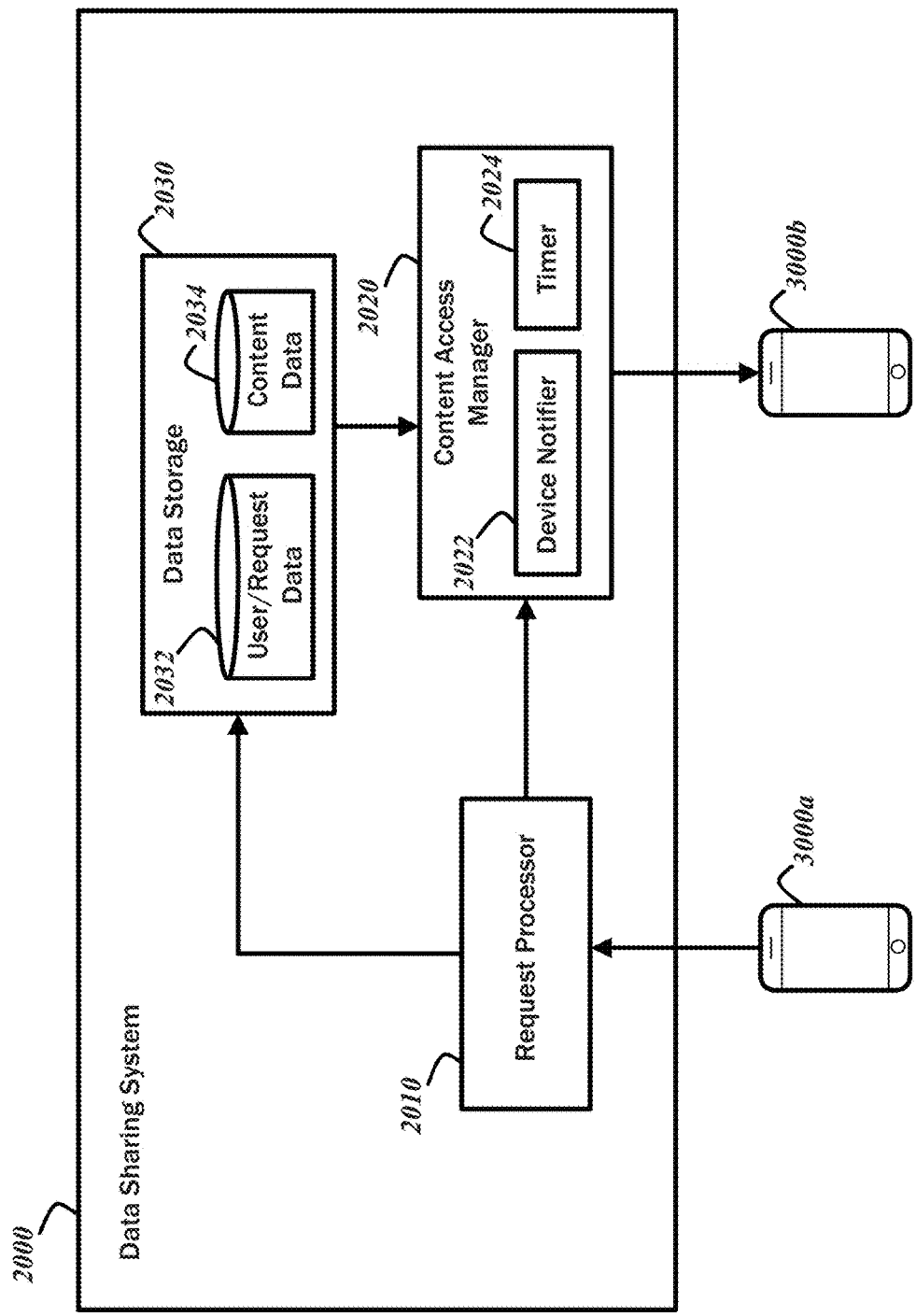
FIG. 16 shows an example data sharing system according to an embodiment of the present disclosure.

FIG. 16 shows an example data sharing system 2000 according to an embodiment of the present disclosure. The data sharing system 2000 may be an example of the system 100 described in relation to FIG. 1 and may function as a server as depicted in FIGS. 6A, 8A, and 13 to support data sharing between a first computing device 3000a and a second computing device 3000b (e.g. mobile phones). Referring to the server-side processes described above in relation to FIG. 15 by way of example, a request processor 2010 of the data sharing system 2000 may receive the submission request uploaded in step 4, data of which may be stored in a data storage 2030. For example, a user/request data storage 2032 may store data indicative of the sender, recipient, and/or request parameters associated with the request while an content data storage 2034 stores the data of the uploaded content in association therewith. A content access manager 2020 may then provide the content to the second computing device 3000b, including any optional push notification as generated by the device notifier 2022 and/or period of time for viewing the image as managed by a timer 2024 and discussed above in relation to FIGS. 6A and 6B.

In the embodiments of the present disclosure, the operational flow and the user interface features described above are contemplated to enable one user, e.g., the initiating user, to specifically define his or her persona or visual appearance to the other users, e.g., the recipient. As discussed above, the initiating user is the one selecting the visual element of a photograph, animated image, video, etc. and that is propagated to those receiving users that the initiating user selects. This is understood to represent a departure over conventional contact list modalities by which the recipient of a phone call, text message, or the like assigns a photograph to a contact, and when there is an incoming telecommunications request, the recipient-selected image is presented. Effectively, this places the control of the initiating user's persona in the hands of the initiating user, relative to one or more of the recipient users.

It should be noted that such functionality, as exemplified by FIGS. 10A, 10B, 11, and 12 in relation to a user interface 1500 associated with a native call controller 1110, may also be provided in relation to the user interfaces 1200, 1400 described above in relation to the mobile application 1100. For example, referring to the sequence of screenshots shown in FIGS. 3A and 3B, selection of an image 1220 may be used to define a sender-selected image associated with a given contact item 1210 that will then appear on a recipient's screen when the sender initiates a phone call, text message, etc. to the recipient.

Figure 17:
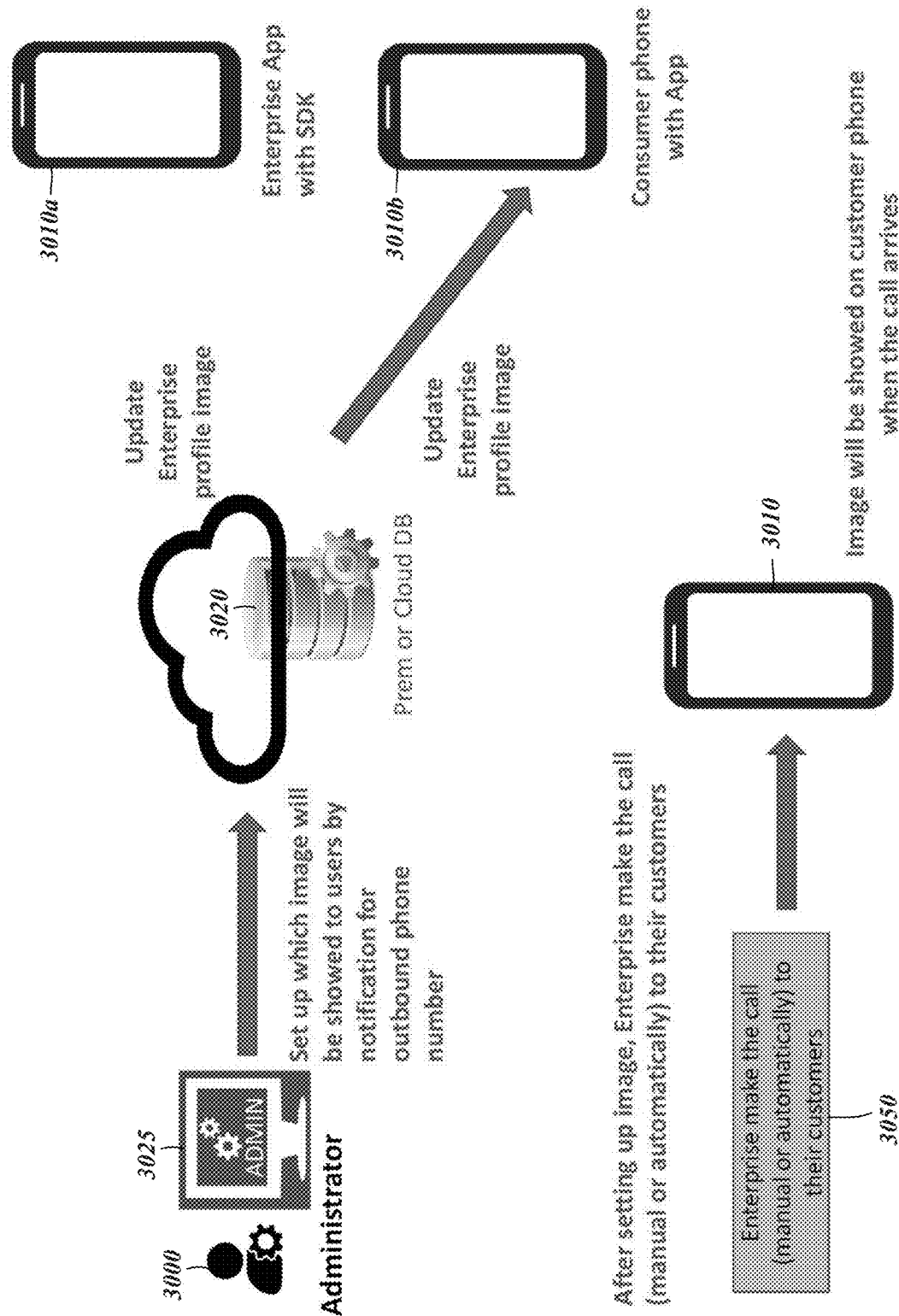
FIG. 17 is a block diagram illustrating an example operational flow according to still another embodiment of the present disclosure.

The embodiments of the present disclosure need not be limited to the exchange of contact data between two mobile devices and is possible between an enterprise and multiple end users/customers thereof. With reference to the block diagram of FIG. 17, an enterprise administrator 3000 may designate an image or other content such as video, audio, combination of video and audio, and so on to be presented to a user when a telephone call or other communications session is initiated from the enterprise to the user. The content may also be an interactive sequence that may include graphics, audio, as well as instructions and/or data that can be used to present a user interface element on which input may be received. The inputs may be returned to the enterprise to signal the preferred direction of the subsequent communication session such as obtaining additional information, completing a transaction, and so on.

The user device 3010 may be a smartphone or other mobile communications device that is capable of running various software applications that extend its functionality. In one embodiment, a software development kit (SDK) interface may be embedded into an enterprise application such as is the case with the user device 3010a. Alternatively, a consumer user device 3010b may include an application such as that utilized in the other embodiments of the present disclosure described above, e.g., the mobile application 1100. It may be possible to integrate the SDK interface into an existing mobile application with widespread deployment so that an independent enterprise application is not necessary.

The administrator 3000 interacts with an enterprise data sharing administration system 3020, which may be on-premises at the enterprise, or may be cloud-based, that is, remote from the enterprise. The enterprise data sharing administration system 3020 may be configured and operated via a control panel 3025. Through the control panel 3025, the administrator 3000 sets the content that is to be provided to the user device 3010.

Figure 18:
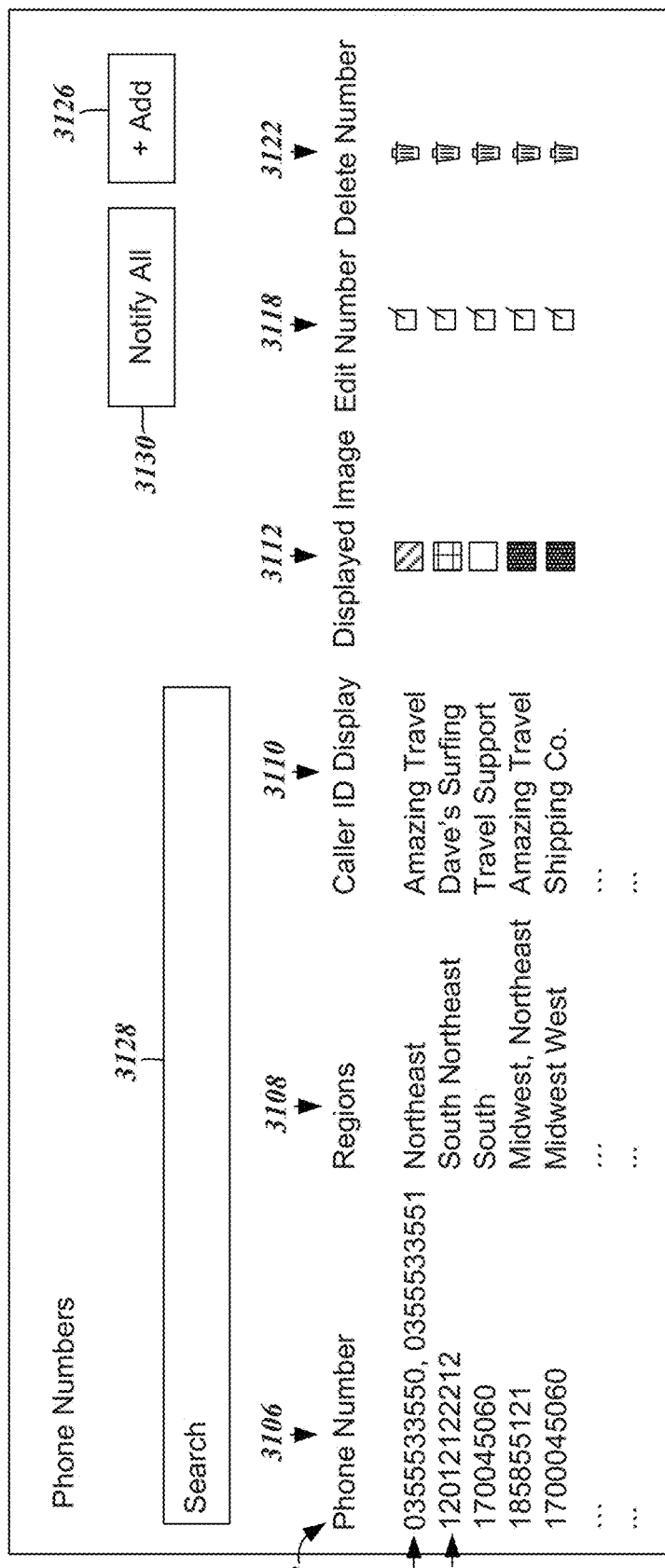
FIG. 18 is a screenshot of an exemplary administrative interface or control panel for an enterprise data sharing administration system according to an embodiment of the present disclosure.

FIG. 18 shows a screenshot of an exemplary interface 3100 of the control panel 3025 for the enterprise data sharing administration system 3020. The interface 3100 includes a listing 3102 organized according to rows and columns, which each row corresponding to a separate record 3104 for a given user. Typically, one user is associated with one telephone number, but need not be limited thereto. One user may be associated with multiple telephone numbers, as shown in the first record 3104a. The specific number is shown in a first column 3106, while the geographic region with which that user is associated is listed in a second column 3108. Like the telephone number field, the user may be associated with multiple regions, as shown in the second record 3104b. In a third column 3110, an identity of the enterprise that is to be presented to the particular user when called is listed. For example, when the user corresponding to the first record 3104a is called, "Amazing Travel" is indicated in the caller identification. In a fourth column 3112, a thumbnail 3114 of an image that is to be presented to the user when called is listed.

The interface 3100 includes active elements that invoke further functionality to edit the records 3104, so for each one, there is a specific edit record link 3116 in a fifth column 3118 of the listing 3102. Similarly, the interface 3100 includes active elements to invoke functionality to remove the records 3104, so for each one, there is a specific remove number link 3120 organized in a sixth column 3122 of the listing 3102. From the interface 3100, it is also possible to add new records by invoking such functionality via an add button 3126. Further details on these functionalities will be described more fully below.

The listing 3102 is contemplated to encompass the data set of the users/call recipients that the enterprise desires to contact, so the enterprise data sharing administration system 3020 is specific to that enterprise. However, it is possible for the enterprise data sharing administration system 3020 to be utilized by multiple enterprises each with their own data silo for the contact information, so the system and the associated data may be segregated accordingly with one enterprise being restricted from accessing the data of another. Although only a small number of listings 3102 are shown in the exemplary interface 3100, some data sets of enterprises may number in the thousands to hundreds of thousands. In this case, identifying only specific records of interest may be desirable. As such, the interface 3100 may include a search box 3128 in which various search terms may be entered to narrow the listing 3102 that is shown.

Figure 19:
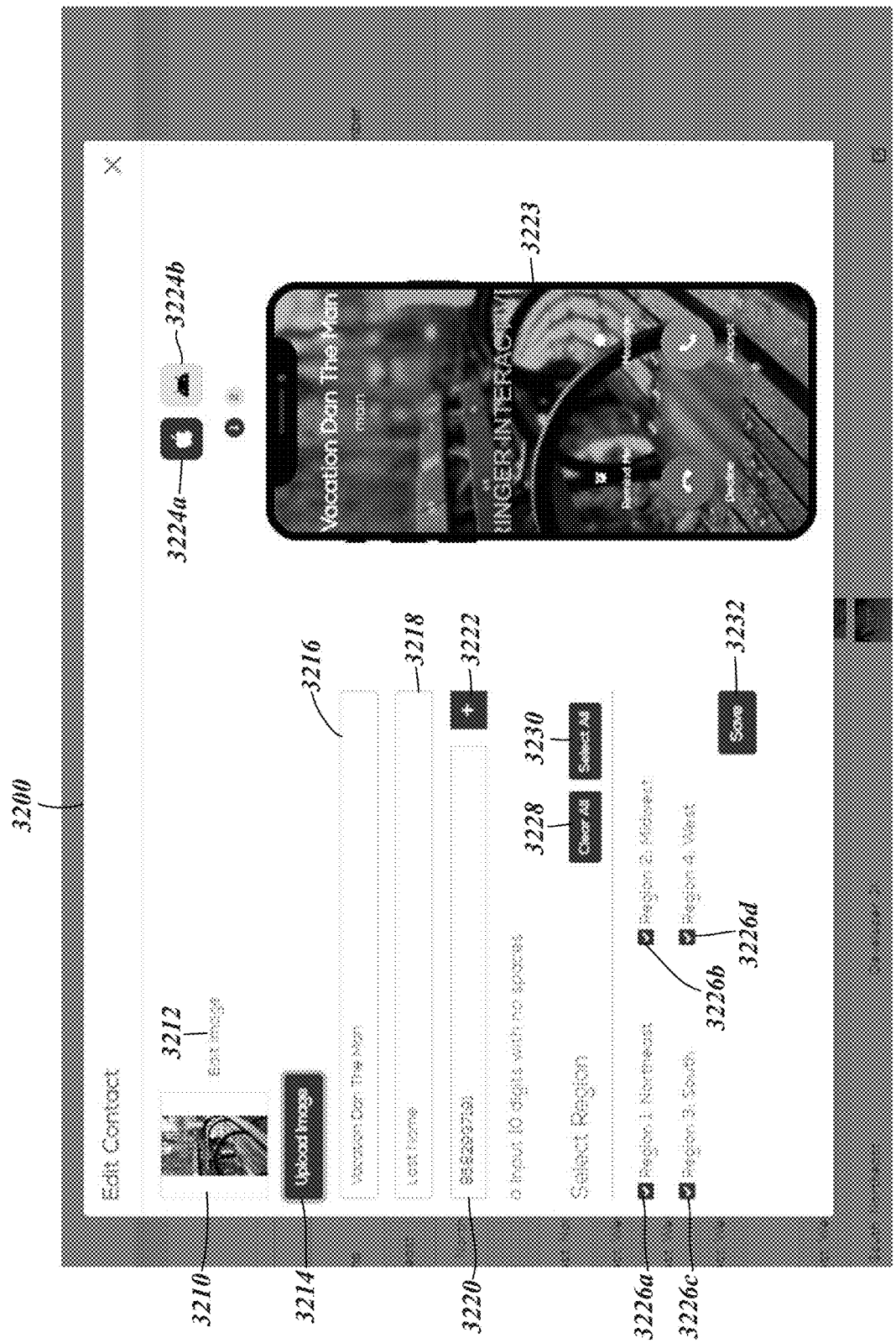
FIG. 19 is a screenshot of an exemplary administrative interface of the enterprise data sharing administration system for editing a contact managed thereby according to an embodiment of the present disclosure.

FIG. 19 shows a screenshot of a subsidiary interface 3200 for editing a single contact record and may be invoked by selecting the edit record link 3116 for a given one of the records 3104. The interface 3200 includes an enlarged thumbnail 3210 showing the content that has been selected to be presented to this user when called. Various attributes of the image may be edited by invoking a further subsidiary interface therefor with an edit image link 3212. A different image altogether may be added from the local computer system from which the control panel 3025 is accessed with an upload image button 3214.

The identity of the enterprise that will be presented to the user associated with this record may be specified in a first text box 3216 as well as a second text box 3218. To the extent a single text string is needed (such as for company names), only the first text box 3216 may be used. In the illustrated example, the name "Vacation Dan The Man" is entered into the first text box 3216. The second text box 3218 may be used to specify a last name, where the first text box 3216 is used to specify a first name. The number of the enterprise that is to initiate the subsequent telephone call is specified in a third text box 3220. An enterprise may utilize more than one outgoing telephone line/number, so those additional numbers may be added by invoking an add number button 3222. These telephone numbers may be stored in the native contact list of the user device 3010 and may serve as a link between the incoming call and provided caller ID data, and the entry for the enterprise in the native contact list.

A mobile device preview 3223 may show a more detailed view of the native incoming call display, with the caller identification and the shared content being shown. Different mobile device platforms may render this information and content in different ways, so an iOS preview may be viewed by activating an iOS button 3224a, and an Android preview may be viewed by activating an Android button 3224b.

The embodiments of the present disclosure contemplate the ability to assign specific content for different geographic regions in which the recipient may be located. For example, a phone call to be placed for someone residing in warmer climates may be presented with a different vacation trip solicitation and accompanying images than someone residing in colder climates. In the illustrated example, up to four regions may be selected via checkboxes 3226a, 3226b, 3226c, and 3226d, including the Northeast, the Midwest, the South, and the West, respectively. These are presented by way of example only and not of limitation, however, and the system may be configured with any other geographic sub-region. Further, the number of regions need not be limited to four, and any additional or fewer number of regions may be administratively set. Clearing of multiple selections and making all selections of the region(s) may be activated via the clear all button 3228 and a select all button 3330.

Figures 20A, 20B:
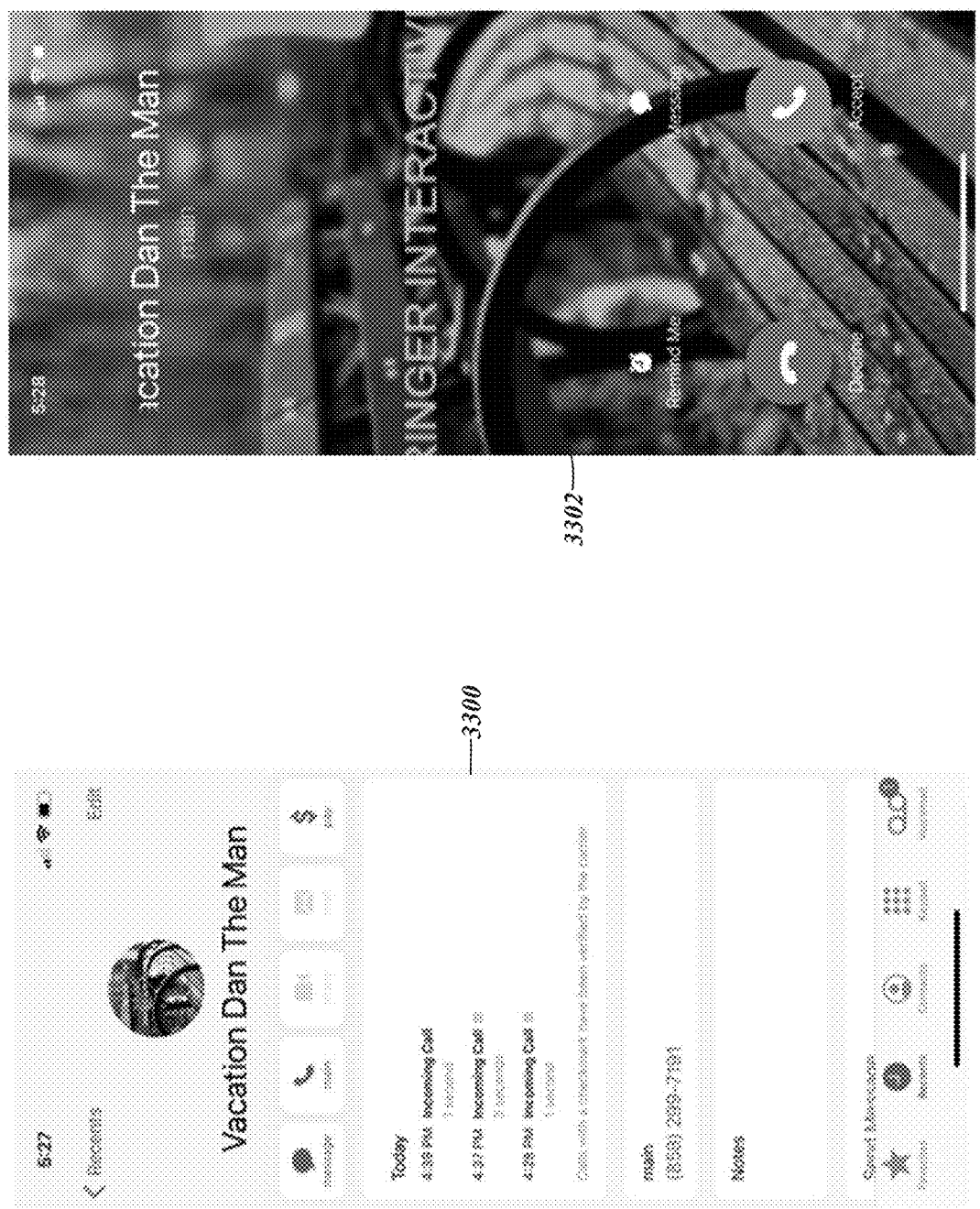
FIGS. 20A and 20B are screenshots of an exemplary mobile device interface showing the contact information of a communications session initiator, and an incoming call screen.

Once the desired data is entered into the interface 3200, it may be saved/committed by activating the save button 3232. This saving/committing step may also be referred to as a data sharing command, as it is understood to be effective to begin the process of sharing the updated data. Referring now to the screenshot of FIG. 20A that shows the native contact list application interface 3300, the content/image is transmitted to the user device 3010, and the entry associated with the enterprise is updated to reflect the name "Vacation Dan the Man" along with the corresponding telephone number as was specified by the administrator. According to some embodiments, this transmission of the content and the identity information associated with the enterprise may be included in a submission request. Once a call is placed from this number to the user device 3010, an incoming call screen 3302 as shown in FIG. 20B, the received content/image as saved to the native contact list, along with the identification of the enterprise, "Vacation Dan the Man." Other native incoming call screen interface elements are shown, but because the associated functions are known to those skilled in the art, additional details thereof will be omitted. The interface 3100 as well as the various subsidiary interfaces thereof are understood to be the constituent parts of the administrative control panel for the enterprise data sharing administration system 3020. Although embodiments of the present disclosure have been described in the context of a telephone call, any other communication session that is initiated from the enterprise may be substituted, including video calls, short message service (SMS) text messages, or any other type of message or notification.

Figure 21:
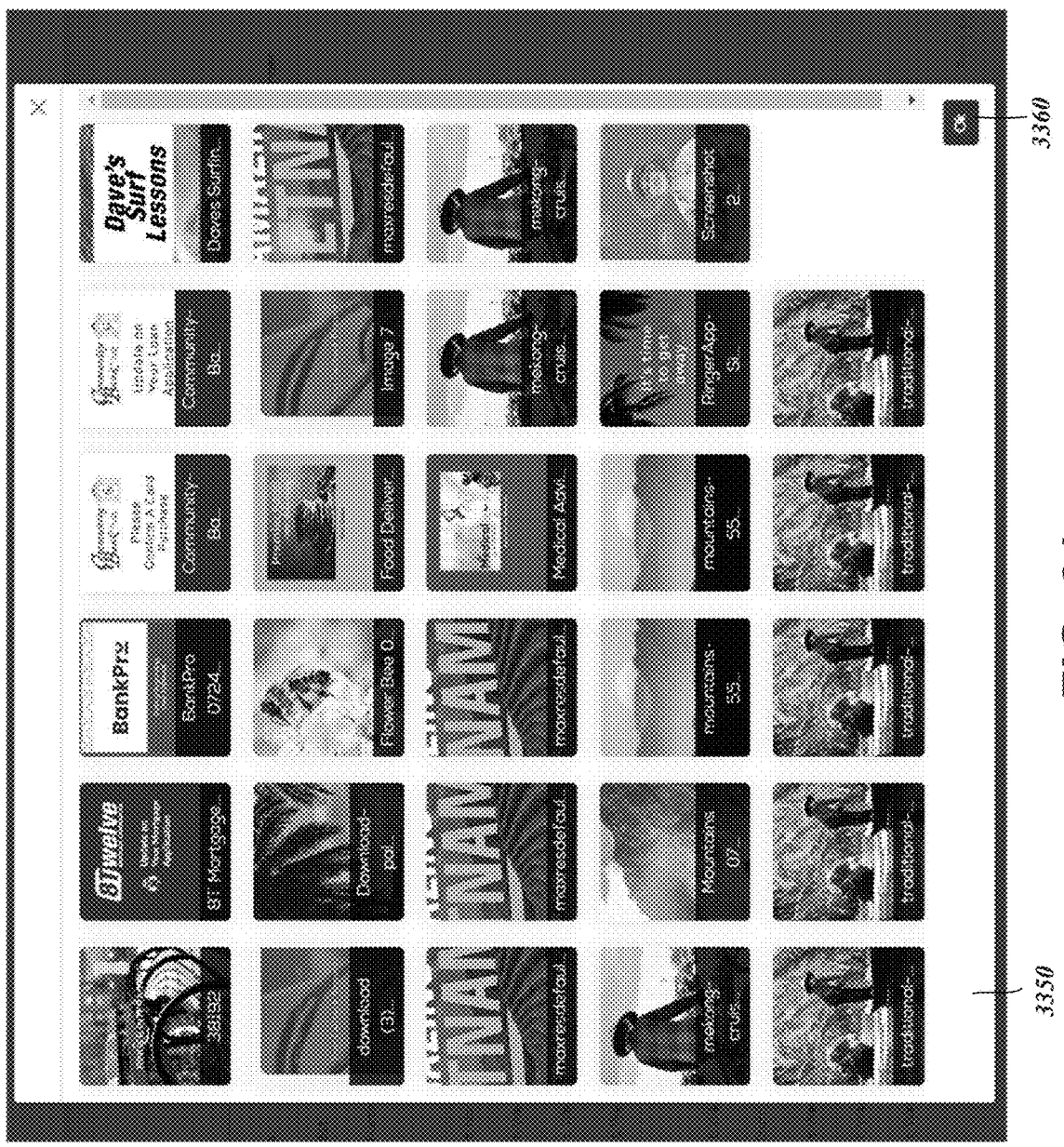
FIG. 21 is a screenshot of a content selection screen of the administrative interface.

As indicated above, the content/image to be presented in the incoming call screen interface of the user device 3010 may be modified by the enterprise in accordance with various embodiments of the present disclosure. FIG. 21 illustrates an exemplary implementation of a content selection screen 3350, which may be a gallery or an array of image thumbnails corresponding to the selectable images.

The presentation of the thumbnails is by way of example only, and any other interface in which numerous images can be presented at once for selection by the administrator is possible. Once a selection is made, it may be confirmed and committed by selecting the OK button 3360.

Figure 22:
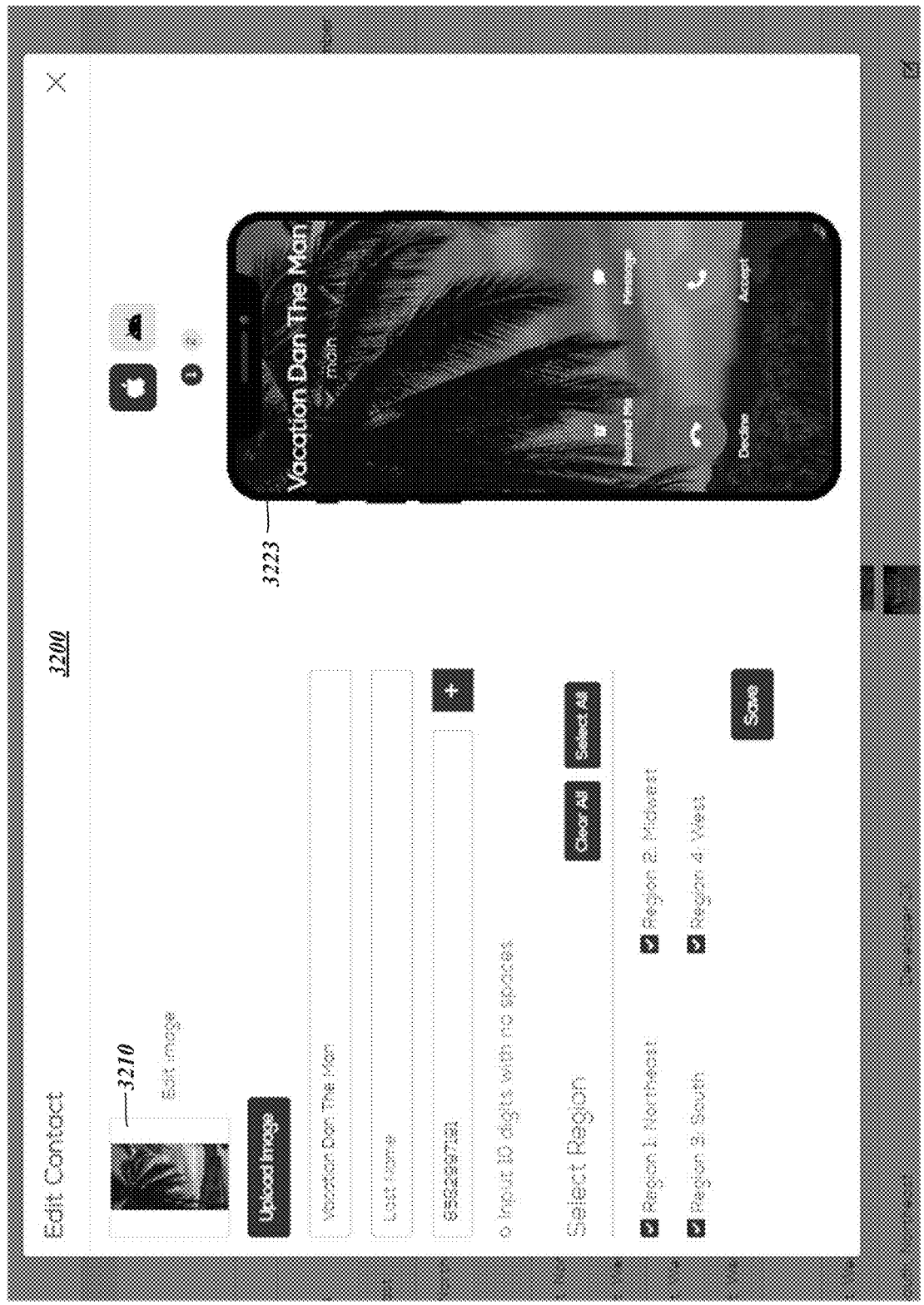
FIG. 22 is a screenshot of the administrative interface editing the contact after a different selection of content to be shared therewith has been made.

After this modification is made, the thumbnail 3210 and the mobile device preview 3223 in the interface 3200 are updated as shown in FIG. 22. A notice regarding the modification may be generated to the impacted users/recipients according to various embodiments of the present disclosure. Referring back to the interface 3100 of FIG. 18, there may be a "Notify All" button 3130. This notification may be made silently in the background, or via a popup using the mobile device native notification system, and may be another variation of a communication session as contemplated within the scope of the embodiments of the present disclosure.

Figure 23A:
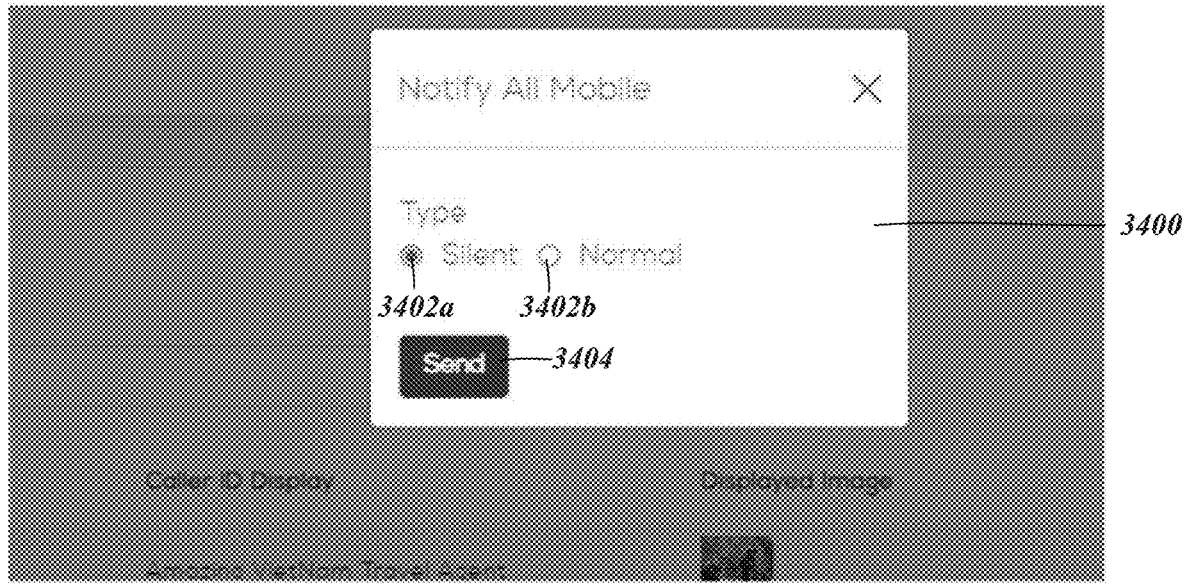
FIG. 23A and FIG. 23B are screenshots of selecting different notification modalities in the administrative interface.
Figure 23B:
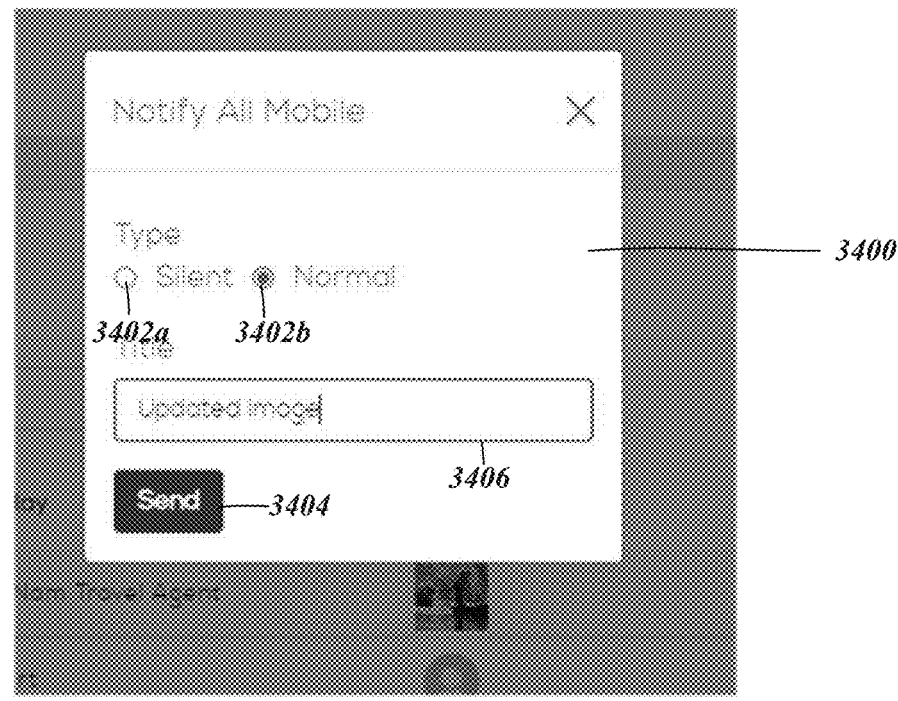

The notification itself may originate from the application on the user device 3010. FIG. 23A shows an exemplary notification interface 3400 with mutually exclusive radio buttons 3402a and 3402b for silent and normal notifications, respectively. With the silent notification radio button 3402a selected, no other input or parameter is needed, and the update may be transmitted by activating a send button 3404. In this context of a silent notification, there is understood to be no visual indication on the user device 3010, and is essentially effective to transmit the updates to the enterprise contact information. FIG. 23B shows the notification interface 3400 with the normal notification radio button 3402b selected. Because a visual indication on the user device 3010 will be presented, text information describing the update may be specified in a text box 3406, for example, "Updated Image". An example notification is shown in FIG. 24 and the user device interface 3500, with a popup screen 3510 being presented in accordance with the inputted text.

Figures 24, 25, 26:
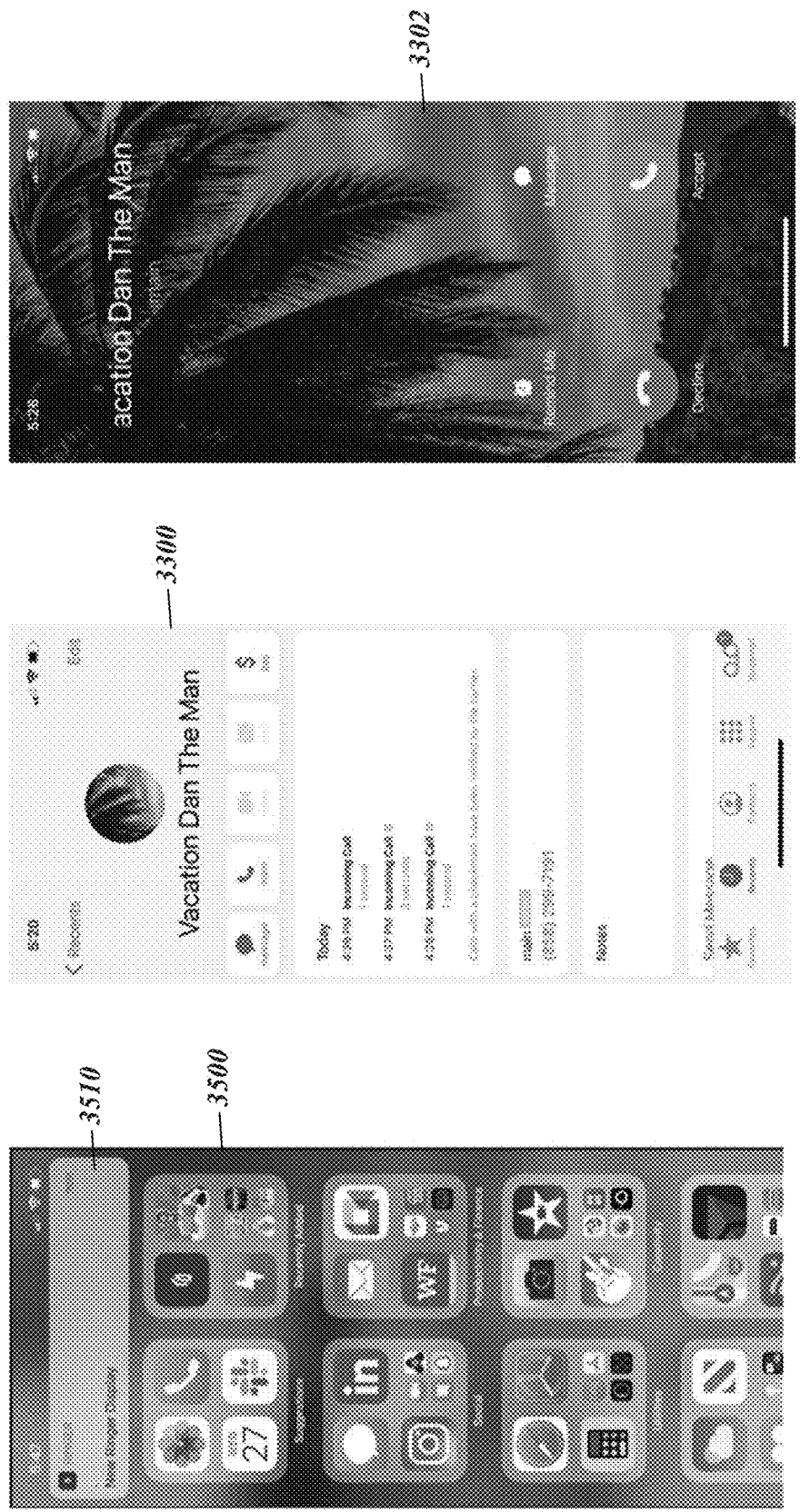
FIG. 24 is a screenshot of the mobile device interface showing a notification that the content has been updated.
FIG. 25 is a screenshot of a native contact list detail screen for the communication session initiator.
FIG. 26 is a screenshot of a native call handler generating an alert of an incoming call with the updated content being presented thereon.

The native contact list application interface 3300 shown in FIG. 25 includes the updated content/image for the enterprise, and the incoming call screen 3302 shown in FIG. 26 presents the updated content/image in the background as well. This updating of the local record on the user device 3010 may be made indirectly via the enterprise application installed thereon, or directly via functionality programmed into the contact list feature of the mobile device. The enterprise application in turn communicates with the enterprise data sharing administration system 3020 via the SDK and its application programming interfaces (API). According to one embodiment, these APIs are REST (Representation State Transfer) APIs.

Figure 27:
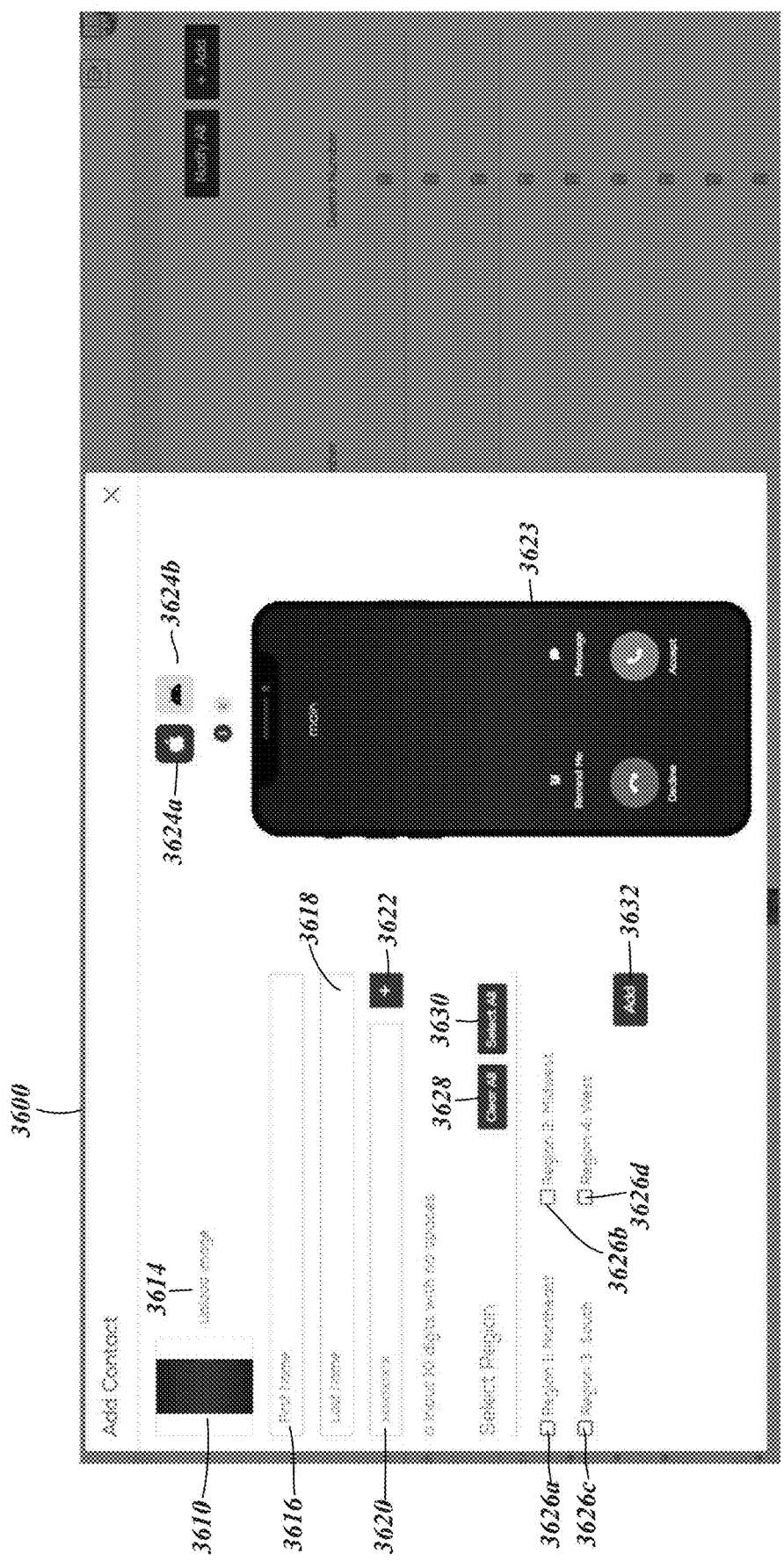
FIG. 27 is a screenshot of the administrative interface adding a new contact.

As indicated above, it is possible to add new records via the add button 3126 on the interface 3100. With reference to FIG. 27, the essential features of the subsidiary interface 3600 for adding a new record are the same as those for editing an existing record. The interface 3600 includes an enlarged thumbnail 3610 showing the content that has been selected to be presented to this user when called. An image may be added from the local computer system from which the control panel 3025 is accessed with an upload image button 3614.

The identity of the enterprise that will be presented to the user associated with this record may be specified in a first text box 3616 as well as a second text box 3618. The first text box 3616 may be for the first name and the second text box 3618 may be for the last name, though only the first text box 3616 may be use for company names. The number of the enterprise that is to initiate the subsequent telephone call is specified in a third text box 3620. An enterprise may utilize more than one outgoing telephone line/number, so those additional numbers may be added by invoking an add number button 3622.

A mobile device preview 3623 may show a more detailed view of the native incoming call display, with the caller identification and the shared content being shown. Different mobile device platforms may render this information and content in different ways, so an iOS preview may be viewed by activating an iOS button 3624a, and an Android preview may be viewed by activating an Android button 3624b.

The record may be assigned to one or more of several geographical regions. In the illustrated example, up to four regions may be selected via checkboxes 3626a, 3626b, 3626c, and 3626d, including the Northeast, the Midwest, the South, and the West, respectively. Again, these are presented by way of example only and not of limitation, however, and the system may be configured with any other geographic sub-region. Further, the number of regions need not be limited to four, and any additional or fewer number of regions may be administratively set. Clearing of multiple selections and making all selections of the region(s) may be activated via the clear all button 3628 and a select all button 3630. Once the form fields are populated, an add button 3640 may be activated to commit the data to storage.

The system 100 and/or application server 110 of FIG. 1 and/or the system 2000 of FIG. 16 may be wholly or partly embodied in a computer including a processor (e.g. a CPU), a system memory (e.g. RAM), and a hard drive or other secondary storage device. The processor may execute one or more computer programs, which may be tangibly embodied along with an operating system in a computer-readable medium, e.g., the secondary storage device. The operating system and computer programs may be loaded from the secondary storage device into the system memory to be executed by the processor. The computer may further include a network interface for network communication between the computer and external devices (e.g. over the Internet), such as the mobile devices accessing the user interface 1200, 1400 described throughout this disclosure using the mobile application 1100.

The computer programs may comprise program instructions which, when executed by the processor, cause the processor to perform operations in accordance with the various embodiments of the present disclosure. The computer programs may be provided to the secondary storage by or otherwise reside on an external computer-readable medium such as a DVD-ROM, an optical recording medium such as a CD or Blu-ray Disk, a magneto-optic recording medium such as an MO, a semiconductor memory such as an IC card, a tape medium, a mechanically encoded medium such as a punch card, etc. Other examples of computer-readable media that may store programs in relation to the disclosed embodiments include a RAM or hard disk in a server system connected to a communication network such as a dedicated network or the Internet, with the program being provided to the computer via the network. Such program storage media may, in some embodiments, be non-transitory, thus excluding transitory signals per se, such as radio waves or other electromagnetic waves. Examples of program instructions stored on a computer-readable medium may include, in addition to code executable by a processor, state information for execution by programmable circuitry such as a field-programmable gate arrays (FPGA) or programmable logic array (PLA).

Throughout the above description of the user interface 1200, 1400 and other user interfaces of the mobile devices described herein, reference is made to various means of user interaction, including tapping on or swiping various user interface elements. The disclosure is not intended to be limited to such specific interactions and any known user-device interactions may be applicable, including but not limited to keyboard, mouse, touch, gesture, voice, eye-tracking, etc.

Although the foregoing examples variously refer to images presented to users, it is expressly contemplated that any data, including video data, audio data, text data, and any other data that may be visually represented may be substituted without departing from the scope of the present disclosure. Although the foregoing examples refer to mobile devices (e.g. smartphones, tablets, laptop computers) of the sender and receiver, it is contemplated that one or both of the mobile devices may instead be a computing device other than a mobile device, such as a desktop computer. In this case, the mobile application 1100 be a desktop application (e.g. a web browser). As an example, a service provider may make use of an enterprise interface in the form of a desktop computer for sending out multi-media or visual notifications (e.g. appointment confirmations as described above) to consumer/customer mobile devices according to the embodiments of the disclosure. Furthermore, along these lines, the specific embodiments described above with respect to certain components performing the steps of the contemplated methods, that is, the functionalities being allocated or attributed to one mobile device or computing device or another, is likewise by way of example only and not of limitation. For instance, an administrative module may be provided to an enterprise via the aforementioned desktop application to perform one or more of the functions described above.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A non-transitory program storage medium on which are stored instructions executable by a processor or programmable circuit to perform operations for enhancing data sharing, the operations comprising:
   receiving, on an administrative control panel, a data sharing command including a selection of content, identity information of a communication session initiator, and identity information of a communication session recipient; and
   transmitting to a computing device associated with the selected communication session recipient, a submission request in response and corresponding to the data sharing command, the submission request including the visual content and the identity information of the communication session initiator;
   wherein in response to a receipt of the submission request, local records on the computing device associated with the selected communication session recipient are updatable with the received content and the identity information of the communication session initiator for presentation to the communication session recipient upon an incoming communications session request;
   wherein the data sharing command further includes a selection of one or more geographical regions to which the communication session recipient is associated.

2. The non-transitory program storage medium of claim 1, wherein the computing device associated with the selected communication session recipient is a mobile device.

3. The non-transitory program storage medium of claim 1, wherein the content is selected from a group consisting of: an image, a video sequence, an audio sequence, and an interactive sequence.

4. The non-transitory program storage medium of claim 1, wherein the communication session is selected from a group consisting of: a telephone call, a message, a short message service (SMS) text message, and a notification.

5. The non-transitory program storage medium of claim 4, wherein the identity information of a communication session initiator is a telephone number associated therewith.

6. The non-transitory program storage medium of claim 4, wherein the identity information of a communication session initiator is text descriptor thereof.

7. A method for enhanced enterprise data sharing to end users, comprising:
   receiving, on a control panel for an enterprise data sharing administration system, a data sharing command including a selection of content, identity information of a communication session initiator, and identity information of a communication session recipient;
   transmitting from the enterprise data sharing administration system to a computing device associated with the selected communication session recipient a submission request in response and corresponding to the data sharing command, the submission request including the content and the identity information of the communication session initiator;
   updating local records on the computing device associated with the selected communication session recipient with the received content and the identity information of the communication session initiator;
   initiating the communication session from the communication session initiator to the communication session recipient; and
   presenting the updated content and the identity information of the communication session initiator in response to the initiated communication session;
   wherein the data sharing command further includes a designation of one or more geographical regions to which the communication session recipient is associated.

8. The method of claim 7, wherein the computing device associated with the selected communication session recipient is a mobile device.

9. The method of claim 8, wherein the computing device associated with the selected communication session recipient includes an application that communicates with the enterprise data sharing administration system through an application programming interface to receive the visual content and the identity information of the communication session initiator.

10. The method of claim 7, wherein the local records on the computing device associated with the selected communication session recipient is a native contact list of the mobile device.

11. The method of claim 7, wherein the communication session is selected from a group consisting of: a telephone call, a message, a short message service (SMS) text message, and a notification.

12. The method of claim 7, wherein the content is selected from a group consisting of: an image, a video sequence, an audio sequence, and interactive sequence.

13. A non-transitory program storage medium on which are stored instructions executable by a processor or programmable circuit to perform operations for enhancing data sharing, the operations comprising:

receiving, on a computing device associated with a communication session recipient, a submission request corresponding to a data sharing command and including content and identity information of a communication session initiator;

updating a local record on the computing device associated with the communication session initiator with the received submission request;

receiving an incoming request to initiate a communication session from the communication session initiator independently of receiving the submission request; and presenting the content and the identity information as updated in the local record on the computing device associated with the communication session recipient;

wherein the data sharing command further includes a selection of one or more geographical regions to which the communication session recipient is associated.

14. The non-transitory program storage medium of claim 13, wherein the content is selected from a group consisting of: an image, a video sequence, an audio sequence, and an interactive sequence.

15. The non-transitory program storage medium of claim 13, wherein the communication session is selected from a group consisting of: a telephone call, a message, a short message service (SMS) text message, and a notification.

16. The non-transitory program storage medium of claim 13, wherein the computing device associated with the communication session recipient has an application being executed thereon in communication with an enterprise data sharing administration system from which the submission request originates over a data exchange independent of the communication session.

17. The non-transitory program storage medium of claim 16, wherein the local record is updated by the application on the computing device.

18. The non-transitory program storage medium of claim 16, the operations further comprising:

generating an alert on the computing device associated with the communication session recipient in response to updating the local record.

19. The non-transitory program storage medium of claim 13, wherein the computing device associated with the communication session recipient is a mobile device, the local record being an entry in a native contact list of the mobile device.

* * * * *